United States Patent
Kinpara et al.

(10) Patent No.: US 8,430,375 B2
(45) Date of Patent: *Apr. 30, 2013

(54) FOAM FILLING MEMBER

(75) Inventors: Kazuhiko Kinpara, Osaka (JP); Shinji Muto, Osaka (JP); Shinpei Nishikawa, Osaka (JP); Takehiro Ul, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,997

(22) Filed: Aug. 27, 2010

(65) Prior Publication Data

US 2010/0325994 A1 Dec. 30, 2010

Related U.S. Application Data

(62) Division of application No. 11/289,525, filed on Nov. 30, 2005, now Pat. No. 7,819,377.

(30) Foreign Application Priority Data

Dec. 1, 2004 (JP) .................................. 2004-348947
Dec. 3, 2004 (JP) .................................. 2004-351626
Oct. 14, 2005 (JP) .................................. 2005-299677

(51) Int. Cl.
*B28B 7/00* (2006.01)
*B29C 33/00* (2006.01)

(52) U.S. Cl.
USPC ............... 249/117; 249/83; 249/94; 249/98; 249/134; 428/124; 52/309.4; 52/309.15; 52/404.1; 52/745.17

(58) Field of Classification Search .... 52/309.1–309.17, 52/745.17, 745.19, 404.1; 428/365, 124, 428/131; 521/65; 249/83, 94, 98, 134, 13, 249/65, 33; 403/4, 14, 52, 155, 326–329, 403/298, 396–397, 384–385, DIG. 10–DIG. 11; 24/297, 453, 602, 326, 581.11; 411/508–510, 411/913; 248/71, 229.16; 174/138 D, 138 G
See application file for complete search history.

(56) References Cited

U.S. PATENT DOCUMENTS

| 1,719,618 | A | 7/1929 | Novick |
| 1,945,932 | A | 2/1934 | Caley |

(Continued)

FOREIGN PATENT DOCUMENTS

| EP | 1 273 480 A1 | 1/2003 |
| FR | 2245151 | 5/1975 |
| JP | 64-12976 | 1/1989 |
| JP | 64-012976 A | 1/1989 |
| JP | 5-40086 | 5/1993 |
| JP | 7-205835 | 8/1995 |
| JP | 8-118499 | 5/1996 |
| JP | 8-197559 | 8/1996 |
| JP | 8-282396 | 10/1996 |

(Continued)

*Primary Examiner* — Jeanette E. Chapman
(74) *Attorney, Agent, or Firm* — Jean C. Edwards, Esq.; Edwards Neils PLLC

(57) ABSTRACT

A foam filling member that can hold a foam sheet in a looped shape stably, without increasing the number of components, to provide improved vibration suppression and sound insulation. The strip-like foam sheet is formed in a looped shape by bending round it, so that both end portions of the foam sheet are overlapped with each other in a thickness direction thereof to form an overlapped portion therein. Then, insertion shafts of a clip are inserted through the overlapped portion, so that the overlapped portion is held in sandwich relation between a base portion and a head portion to form a foam filling member. Then, a supporting portion of the fixing portion of the clip is inserted in a fixing hole of an inner panel and fixed to the inner panel. After the inner panel and an outer panel are welded, the foam filling member is foamed, cross-linked, and cured by heating in a drying line process at the baking finish, to thereby produce the foam, whereby the interior space of the pillar is filled up with the foam, leaving no space therein.

5 Claims, 17 Drawing Sheets

U.S. PATENT DOCUMENTS

| | | | |
|---|---|---|---|
| 2,960,561 A | 11/1960 | Plummer | |
| 3,000,433 A | 9/1961 | Kemper | |
| 3,193,894 A | 7/1965 | Rutter et al. | |
| 3,210,032 A * | 10/1965 | Slyke | 248/73 |
| 3,234,610 A | 2/1966 | Timmerbeil et al. | |
| 3,351,263 A | 11/1967 | Wood | |
| 3,467,354 A | 9/1969 | Graham | |
| 3,491,753 A | 1/1970 | Milton | |
| 3,505,759 A | 4/1970 | McKee et al. | |
| 3,588,965 A | 6/1971 | Terkel et al. | |
| 3,667,710 A | 6/1972 | Moody et al. | |
| 4,840,345 A * | 6/1989 | Neil et al. | 248/74.2 |
| 4,924,557 A | 5/1990 | Heckerman et al. | |
| 5,028,796 A * | 7/1991 | Swartz | 250/516.1 |
| 5,161,759 A * | 11/1992 | Burns et al. | 248/71 |
| 5,257,845 A | 11/1993 | McConnell | |
| 5,259,397 A | 11/1993 | McCabe | |
| 5,345,679 A | 9/1994 | Lennon et al. | |
| 5,642,914 A | 7/1997 | Takabatake | |
| 5,695,870 A * | 12/1997 | Kelch et al. | 428/318.4 |
| 5,712,015 A * | 1/1998 | Guillem | 428/70 |
| 5,845,833 A * | 12/1998 | Murphy | 224/625 |
| 5,904,024 A | 5/1999 | Miwa | |
| 6,042,296 A * | 3/2000 | Wittig et al. | 403/298 |
| 6,061,854 A * | 5/2000 | Crowley | 5/655 |
| 6,256,845 B1 * | 7/2001 | Tseng | 24/298 |
| 6,276,029 B1 | 8/2001 | Buettell | |
| 6,280,356 B1 | 8/2001 | Sandeen | |
| 6,311,452 B1 | 11/2001 | Barz et al. | |
| 6,367,579 B1 * | 4/2002 | Wiener | 181/199 |
| 6,371,419 B1 * | 4/2002 | Ohnuki | 248/74.2 |
| 6,504,101 B2 * | 1/2003 | Kondoh | 174/135 |
| 6,506,175 B1 | 1/2003 | Goldstein | |
| 6,677,526 B2 * | 1/2004 | Kishizawa | 174/68.1 |
| 6,747,209 B2 * | 6/2004 | Uchida et al. | 174/68.1 |
| 6,809,257 B2 * | 10/2004 | Shibuya | 174/481 |
| 6,885,816 B1 | 4/2005 | Hicks et al. | |
| 6,944,997 B2 | 9/2005 | Verkamp | |
| 6,962,516 B2 * | 11/2005 | Ohki et al. | 445/63 |
| 6,988,585 B2 * | 1/2006 | Mourieras et al. | 181/204 |
| 7,077,461 B2 | 7/2006 | Ratet | |
| 7,140,070 B2 * | 11/2006 | Yuta et al. | 16/4 |
| 7,201,352 B2 * | 4/2007 | Kawai | 248/74.1 |
| 7,627,998 B2 | 12/2009 | Ui et al. | |
| 7,669,807 B2 * | 3/2010 | Stigler et al. | 248/71 |
| 7,819,377 B2 | 10/2010 | Kinpara et al. | |
| 2004/0159481 A1 | 8/2004 | Schneider et al. | |
| 2004/0239148 A1 | 12/2004 | Ratet | |
| 2005/0249916 A1 * | 11/2005 | Muto et al. | 428/131 |
| 2006/0101626 A1 | 5/2006 | Gallant et al. | |

FOREIGN PATENT DOCUMENTS

| | | |
|---|---|---|
| JP | 10-071628 | 3/1998 |
| JP | 10-323911 | 12/1998 |
| JP | 11-091621 | 4/1999 |
| JP | HEI 11-99960 | 4/1999 |
| JP | 11-254462 | 9/1999 |
| JP | 2000-052444 | 2/2000 |
| JP | 2001-18225 | 1/2001 |
| JP | 2001-030252 | 2/2001 |
| JP | 2001-114037 | 4/2001 |
| JP | 2002-84637 | 3/2002 |
| JP | 2002-154129 | 5/2002 |
| JP | 2002-292671 | 10/2002 |
| JP | 2003-15654 | 1/2003 |
| JP | 2003-063443 | 3/2003 |
| JP | 2003-63443 | 3/2003 |
| JP | 2003-340857 | 12/2003 |
| JP | 2004-144848 | 5/2004 |
| JP | 2005-319844 | 11/2005 |
| JP | 2005-319845 | 11/2005 |
| JP | 2007069669 A | 3/2007 |
| WO | WO 00/43253 | 7/2000 |
| WO | WO 03/004314 | 1/2003 |

* cited by examiner

FIG. 3
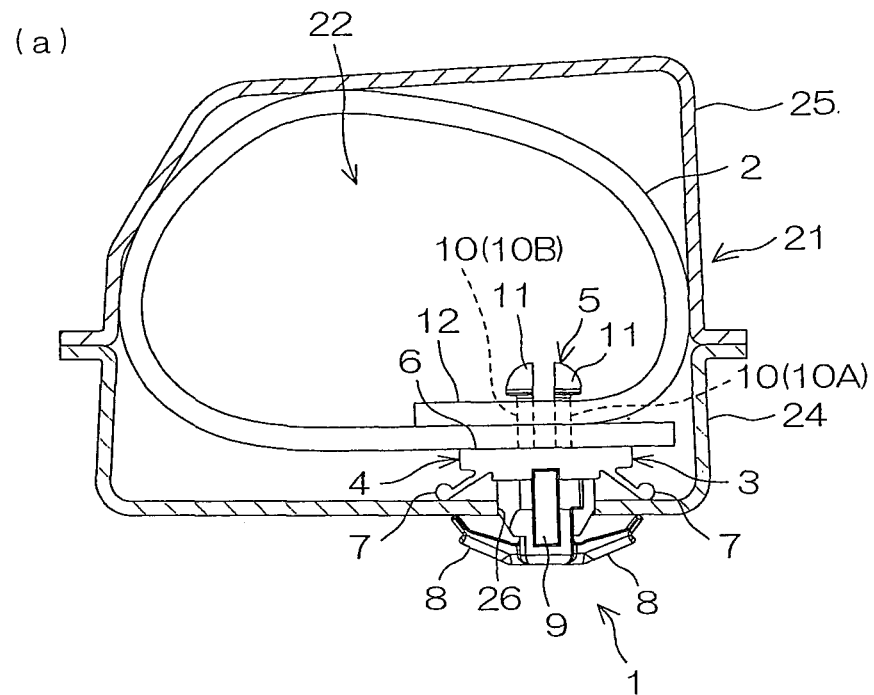
(a)
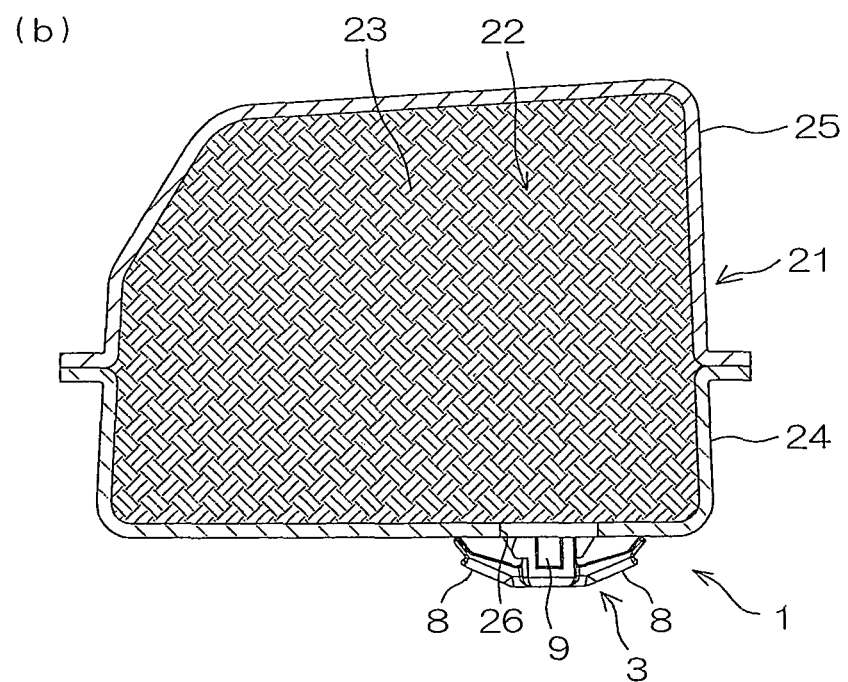
(b)

FIG. 12
(a)
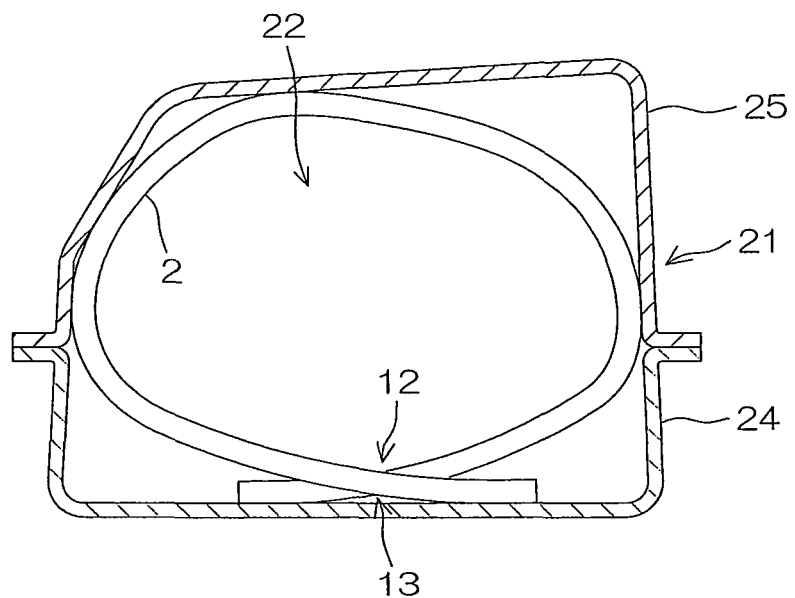
(b)
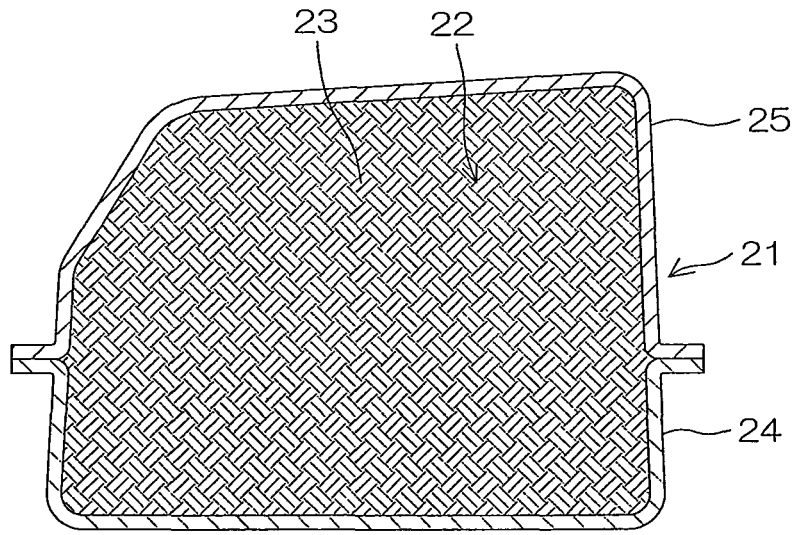

FOAM FILLING MEMBER

CROSS REFERENCE TO RELATED APPLICATION

This application is a Divisional Application of U.S. patent application Ser. No. 11/289,525, filed on Nov. 30, 2005 now U.S. Pat. No. 7,819,377, which claims priority from Japanese Patent Appln. Nos. 2004-348947 filed Dec. 1, 2004, 2004-351626 filed Dec. 3, 2004, and 2005-299677 filed Oct. 14, 2005, the contents of which are herein incorporated by reference in their entirety.

BACKGROUND OF THE INVENTION

1. Field of the Invention

The present invention relates to a foam filling member for forming foam to be filled in a space of a structure.

2. Description of the Prior Art

It is generally known that foam is filled in a hollow structure, such as a pillar of a vehicle, for the purpose of ensuring vibration suppression and sound insulation. A foam filling member is used for forming such foam. In use, the foam filling member is placed in an interior space of the hollow structure to be filled and is foamed by the application of heat from outside to form the foam, so that the interior space is filled with the foam thus formed.

For example JP Laid-open (Unexamined) Patent Publication No. 2003-63443 proposes a hollow panel foam filling method wherein an unfoamed solid foam filling member is placed in an interior filling area of the hollow panel and then is foamed by the application of heat from outside, whereby the foam resulting from the foam formation is filled in the interior filling area. In this document, the foam filling member is in the form of a sheet-like base foam material which is elastically deformable into a rolled shape. The sheet-like base foam material is placed in the interior filling area in the rolled state, so that it is held in the interior filling area by the resilience resulting from the elastic deformation of the rolled base foam material and, then, the as-rolled sheet-like base foam material is foamed by the application of heat, whereby the foam resulting from the foam formation of the base foam material is filled in the interior filling area.

However, this foam filling method described in JP Laid-open (Unexamined) Patent Publication No. 2003-63443 has the disadvantage that since the sheet-like base foam material rolled is held in the interior filling area by the resilience resulting from the elastic deformation of the rolled base foam material, the sheet-like base foam material is not stably kept in the rolled state due to its possible displacement and, resultantly, it cannot be filled in the interior filling area of the hollow panel reliably.

On the other hand, when the sheet-like base foam material is held by a clip and the like for the purpose of keeping the sheet-like base foam material in the rolled state stably, there is provided another disadvantage that the number of components is increased and also there is provided the additional disadvantage that since the clip is buried in the foam, the effects of the foam of vibration suppression and sound insulation are reduced.

Also, some hollow structures, such as, for example, pillars of automobiles, have two inner spaces (e.g. a space between a side frame outer and a center pillar reinforce and a space between the center pillar reinforce and a center pillar inner) to be filled with their respective foams, as disclosed in JP Laid-open (Unexamined) Patent Publication No. Hei 11-99960.

The structure described by JP Laid-open (Unexamined) Patent Publication No. Hei 11-99960 requires that after the foam filling material is set in the space between the side frame outer and the center pillar reinforce, the side frame outer and the center pillar reinforce are welded, and after the foam filling material is set in the space between the center pillar reinforce and the center pillar inner, the center pillar reinforce and the center pillar inner are welded. Thus, this structure requires at least two or more workings for setting the foam filling material in the interior spaces of the hollow structure, making the assembling work cumbersome and complicated.

SUMMARY OF THE INVENTION

It is an object of the present invention to provide a foam filling member that can hold a foaming sheet in a looped shape stably, without increasing the number of components, to provide improved vibration suppression and sound insulation.

It is another object of the present invention to provide a foam filling member that can facilitate the assembling work.

To accomplish the objects mentioned above, the present invention provides a foam filling member for forming foam to fill up a space of a structure, which comprises a foam sheet formed from foamable material and formed in sheet form, and a fixing member for fixing the foam sheet in the space of the structure, wherein the foam sheet is formed in a looped shape so that its portions spaced apart from each other in a longitudinal direction of the foam sheet confront each other, and wherein the fixing member comprises a retaining portion for retaining the portions of the foam sheet, and a fixing portion for fixing the portions of the foam sheet in the structure.

In this foam filling member, the fixing portion of the fixing member can fix the foam sheet in the space of structure, while the retaining portion of the fixing member can keep the foam sheet in its looped shape. In other words, in the foam filling member, the foam sheet can be kept in the looped shape by the fixing member. Hence, the foam sheet can be held stably, while being kept in its looped shape, without increasing the number of components. Accordingly, improved vibration suppression and sound insulation can be provided.

Also, the present invention provides a foam filling member for forming foam to fill up a space of a structure, which comprises a foam sheet formed from foamable material and formed in sheet form, and a fixing member for fixing the foam sheet in the space of the structure, wherein the foam sheet is formed in a looped shape so that an overlapped portion where portions of the foam sheet are overlapped with each other in a thickness direction thereof, and wherein the fixing member comprises a retaining portion, extending through the overlapped portion in the thickness direction, for retaining the foam sheet, and a fixing portion for fixing the foam sheet in the structure.

In this foam filling member, while the foam sheet is held in its looped shape by allowing the retaining portion of the fixing member to pass through the overlapped portion in the thickness direction, the foam sheet is fixed in the space of the structure by the fixing portion of the fixing member. In other words, in this foam filling member, the foam sheet can be kept in the looped shape by the fixing member. Hence, the foam sheet can be held stably, while being kept in its looped shape, without increasing the number of components. Accordingly, improved vibration suppression and sound insulation can be provided.

Also, the present invention provides a foam filling member for forming foam to fill up a space of a structure, which comprises a foam sheet formed from foamable material and formed in sheet form, and a fixing member for fixing the foam sheet in the space of the structure, wherein the foam sheet is formed in a looped shape so that a confronted portion where both lengthwise end portions of the foam sheet are confronted with each other, and wherein the fixing member comprises a retaining portion, extending through the each lengthwise end portion of the foam sheet in the thickness direction, for retaining the foam sheet, and a fixing portion for fixing the foam sheet in the structure.

In this foam filling member, while the foam sheet is held in its looped shape by allowing the retaining portion of the fixing member to pass through the lengthwise end portions of the foam sheet in the thickness direction, the foam sheet is fixed in the space of the structure by the fixing portion of the fixing member. In other words, in this foam filling member, the foam sheet can be kept in the looped shape by the fixing member. Hence, the foam sheet can be held stably, while being kept in its looped shape, without increasing the number of components. Accordingly, improved vibration suppression and sound insulation can be provided.

Also, the present invention provides a foam filling member for forming foam to fill up a space of a structure, which comprises a foam sheet formed from foamable material and formed in sheet form, and a fixing member for fixing the foam sheet in the space of the structure, wherein the foam sheet is formed in a looped shape so that an opposed portion where both lengthwise end portions of the foam sheet are spaced apart from each other and arranged to be opposed to each other, and wherein the fixing member comprises a retaining portion, extending through the each lengthwise end portion of the foam sheet in the thickness direction, for retaining the foam sheet, and a fixing portion for fixing the foam sheet in the structure.

In this foam filling member, while the foam sheet is held in its looped shape by allowing the retaining portion of the fixing member to pass through the lengthwise end portions of the foam sheet in the thickness direction, the foam sheet is fixed in the space of the structure by the fixing portion of the fixing member. In other words, in this foam filling member, the foam sheet can be kept in the looped shape by the fixing member. Hence, the foam sheet can be held stably, while being kept in its looped shape, without increasing the number of components. Accordingly, improved vibration suppression and sound insulation can be provided.

Also, the present invention provides a foam filling member for forming foam to fill up a space of a structure, which comprises a foam sheet formed from foamable material and formed in sheet form, wherein the foam sheet is formed in a looped shape so that an overlapped portion where portions of the foam sheet are overlapped with each other, and wherein a retaining portion for holding the foam sheet in the looped shape is formed at the overlapped portion of the foam sheet.

In this foam filling member, the foam sheet can be held in its looped shape by the retaining portion formed in the overlapped portion of the foam sheet. Hence, the foam sheet can be held stably, while being kept in its looped shape, without increasing the number of components. Accordingly, improved vibration suppression and sound insulation can be provided.

In the present invention, it is preferable that the foam sheet has a flexural modulus of 2-180 MPa.

Also, the present invention provides a foam filling member for forming foam to fill up a space of a structure, which comprises a foam sheet formed from foamable material and formed in sheet form, and a fixing member for fixing the foam sheet in the space of the structure, wherein the foam sheet is held to the fixing member in a freely slidable manner.

In this foam filling member, the foam sheet can be slid with respect to the fixing member in the state of being fixed in the space of the structure by the fixing member. This can allow the foam sheet to be moved to a desired fixing position by sliding the foam sheet with respect to the fixing member, thus facilitating the assembling work. In the foam filling member of the present invention, it is preferable that the fixing member comprises a fixing portion for fixing the foam sheet in the structure, and the foam sheet is held by the fixing member in such a manner as to be extended between one side and the other side with respect to the fixing portion by sliding the foam sheet toward the one side with respect to the fixing portion.

In this foam filling member, the foam sheet can be arranged to extend between one side and the other side with respect to the fixing portion by simply sliding the foam sheet toward the one side with respect to the fixing portion after the fixing portion of the fixing member is fixed in the structure. This can provide the result that for example in the case where spaces of the structure lie on one side of the fixing portion and the other side thereof, respectively, when the fixing portion is fixed in the structure, the foam sheet can be located to extend over the spaces easily. This construction can facilitate the assembling work, as compared with the construction wherein the foam filling members are, placed in the spaces, respectively.

In the foam filling member of the present invention, it is preferable that the foam sheet is parted in two directions intersecting with the sliding direction at a portion thereof located on the one side with respect to the fixing portion.

In this foam filling member, when the foam sheet is slid toward the one side with respect to the fixing portion, the portion of the foam sheet located on one side of the fixing portion can be slid along two directions intersecting with the sliding direction. This can allow the foam sheet to extend over a wide area of the space located on the one side with respect to the fixing portion, thus providing improved vibration suppression and sound insulation.

Also, in the foam filling member of the present invention, it is preferable that the fixing member has a guide portion for guiding the portion of the foam sheet located on the one side with respect to the fixing portion so that when the foam sheet is slid toward the one side with respect to the fixing portion, the portion of the foam sheet located on the one side with respect to the fixing portion can be spread apart in two directions intersecting with the sliding direction.

In this foam filling member, when the foam sheet is slid toward the one side with respect to the fixing portion, the portion of the foam sheet located on the one side with respect to the fixing portion can be spread in two directions intersecting with the sliding direction along the guide portion. This can allow the foam sheet to extend over a wide area of the space located on the one side with respect to the fixing portion, thus facilitating the assembling work.

Also, in the foam filling member of the present invention, it is preferable that the foam sheet is formed in a looped shape to form an overlapped portion where portions of the foam sheet are overlapped with each other, so that both end portions of the foam sheet are located on the one side with respect to the fixing portion.

In this foam filling member, although a relatively small amount of foamable material is used for the foam sheet, since the foam sheet is shaped like a loop, a central portion of the foam sheet can lie over a wide area of the space located on the other side with respect to the fixing portion and also both end portions of the foam sheet can be extended over a wide area of the space located on the one side with respect to the fixing portion. Hence, an amount of foamable material used can be reduced and cost cut can also be achieved.

Also, in the foam filling member of the present invention, it is preferable that the fixing member has a stop which is engageable with the overlapped portion to regulate a sliding movement of the foam sheet when slid toward the other side with respect to the fixing portion.

In this foam filling member, when an external force acting to the other side with respect to the fixing portion acts on the foam sheet, the foam sheet can be prevented from being slid and dropped off from the fixing member by the stop. Thus, since the foam sheet can be prevented from being dropped off from the fixing member during the assembling work, the assembling work can be facilitated.

Also, in the foam filling member of the present invention, it is preferable that in the fixing portion, the fixing member is fixed to a partition wall to partition the space of structure into a first space and a second space in such a manner that the first space is located at the one side with respect to the fixing portion and the second space is located at the other side with respect to the fixing portion.

In this foam filling member, the foam sheet can be located to extend to the first space and the second space by simply sliding the foam sheet toward the one side with respect to the fixing portion after the fixing portion of the fixing member is fixed in the structure. This construction can facilitate the assembling work, as compared with the construction wherein the foam filling members are placed in the first space and the second space, respectively.

DESCRIPTION OF THE DRAWINGS

In the drawings:

FIG. 3 is a process drawing of the first embodiment of the way of filling an internal space of a pillar of an automobile by using the foam filling member shown in FIG. 1, (a) showing the step of placing the foam filling member in the pillar, and (b) showing the step of filling the interior space of the pillar with the foam produced by the foam filling member being foamed, cross-linked, and cured by the application of heat, FIG. 12 is a process drawing of an embodiment of the way of filling an internal space of a pillar of an automobile by using the foam filling member shown in FIG. 11, (a) showing the step of placing the foam filling member in the pillar, and (b) showing the step of filling the interior space of the pillar with the foam produced by the foam filling member being foamed, cross-linked, and cured by the application of heat.

DETAILED DESCRIPTION OF THE PREFERRED EMBODIMENTS

Figure 1:
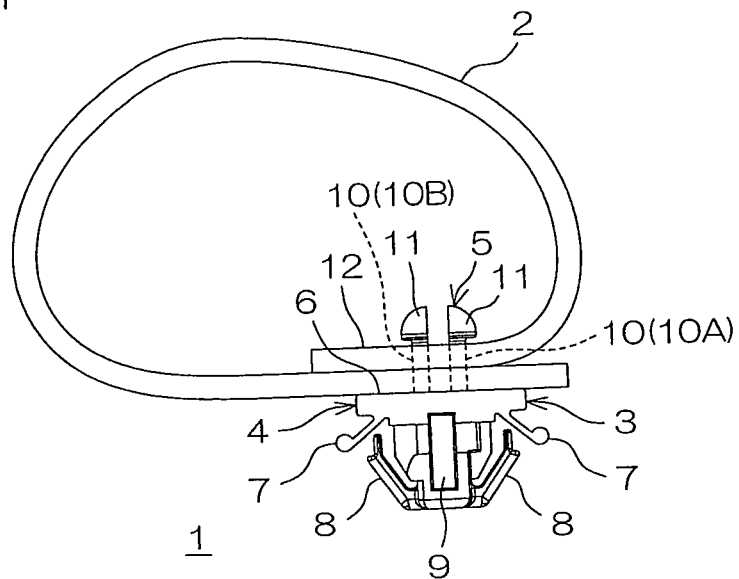
FIG. 1 is a front view showing the first embodiment of a foam filling member of the present invention.
Figure 2:
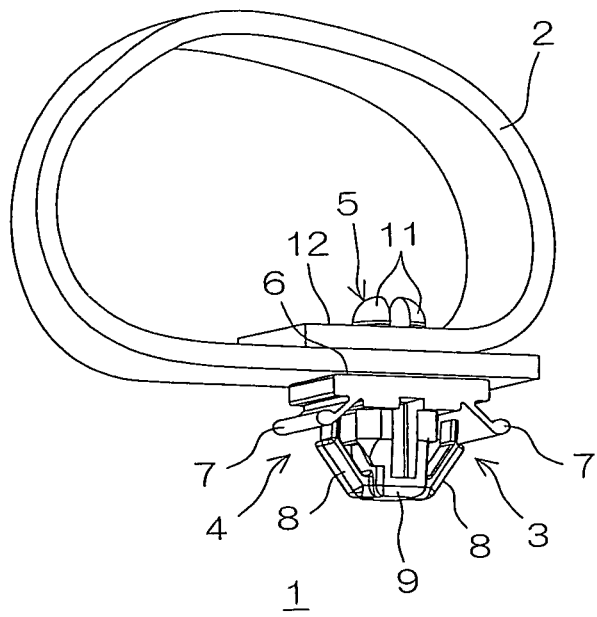
FIG. 2 is a perspective view of the foam filling member shown in FIG. 1.

FIG. 1 is a front view showing the first embodiment of a foam filling member of the present invention. FIG. 2 is a perspective view of the foam filling member shown in FIG. 1, A foam filling member 1 shown in FIGS. 1 and 2 is used for forming foam to be filled in a structural interspace or an interior space of hollow structure. The foam filling member 1 comprises a foam sheet 2, and a clip 3 which is a fixing member for fixing the foam sheet 2 in the structural interspace or the interior space of hollow structure.

The foam sheet 2 in sheet form is formed of foaming material which is foamed by heating (e.g. at about 120° C. to about 210° C.).

Known foamable polymer is used as the foaming material without any particular limitation. The foamable polymer used is not limited to any particular one. The foamable polymers that may be used include, for example, resins, such as ethylene.vinyl acetate copolymer, polyethylene, polypropylene, polyester, polyvinyl butyral, polyvinyl chloride, polyamide, and polyketone, and rubbers, such as styrene-butadiene rubber (SBR), and polybutadiene rubber (BR). Preferably, ethylene.vinyl acetate copolymer is used as the foaming material. The use of ethylene.vinyl acetate copolymer can provide an increased foam ratio. At least one or two materials of foamable polymer can be properly selected from these foamable polymers.

For enhancement of the foaming and curing of the foamable polymer, for example a cross-linking agent, a foaming agent, and, if necessary, a foam auxiliary agent, may be mixed further in the foaming material.

No particular limitation is imposed on the cross-linking agent, while for example a known radical forming agent that can be decomposed by heating to produce a free radical so as to form a cross-linking bond among molecules or in an individual molecule is used as the cross-linking agent. To be more specific, the radical forming agents that may be used include, for example, organic peroxides, such as dicumyl peroxide, 1,1-di-tertiary-butyl-peroxy-3,3,5-trimethyl-cyclohexane, 2,5-dimethyl-2,5-di-tertiary-butyl-peroxyhexane, 2,5-dimethyl-2,5-di-tertiary-butyl-peroxyhexane, 1,3-bis(t-butyl-peroxy-isopropylkenzene)benzene, tertiary-butyl-peroxyketone, and tertiary-butyl-peroxybenzoate.

When the foamable polymer is to be vulcanized, a known vulcanizing agent can be used as the cross-linking agent. No particular limitation is imposed on such a vulcanizing agent. For example, sulfur, sulfur compounds, selenium, magnesium oxide, lead oxide, zinc oxide, polyamines, oximes, nitroso compounds, resins, and ammonium salts can be cited as the vulcanizing agent.

At least one or two materials of these cross-linking agents can be selectively used. No particular limitation is imposed on a mixing ratio of the cross-linking agent. For example, a mixing ratio of the cross-linking agent to the foamable polymer is in the range of 0.1-10 parts by weight, or preferably in the range of 0.5-7 parts by weight.

When the vulcanizing agent is used, a vulcanization accelerator may be used in combination. Known vulcanization accelerators including, for example, dithiocarbamic acids, thiazoles, guanidines, sulfenamides, thiurams, xanthogen acids, aldehyde ammonias, aldehyde amines, and thioureas, may be used. At least one or two materials of these vulcanization accelerators may be selectively used. A mixing ratio of the vulcanization accelerator to the foamable polymer is in the range of 0.1-5 parts by weight.

On the other hand, rather than the vulcanization accelerators, known vulcanization retardants such as, for example, organic acids and amines, may be properly mixed, for the purpose of molding control.

Also, no particular limitation is imposed on the foaming agent. For example, known inorganic or organic foaming agents are used. The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, azo compounds, such as azodicarbonamide, barium azodicarboxylate, azobisisobutyronitrile, and azodicarboxylic amide, nitroso compounds, such as N,N'-dinitrosopentamethylenetetramine, N,N'-dimethyl-N, N'-dinitrosoterephthal amide, and trinitrotrimethyltriamine, hydrazide compounds, such as 4,4'-oxybis(benzenesulfonylhydrazide), paratoluene sulfonylhydrazide, diphenylsulfone-3,3'-disulfonylhydrazide, and allylbis(sulfonylhydrazide), semicarbazide compounds, such as p-toluilene sulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole.

Among these foaming agents, the one that is decomposed at a temperature equal to or higher than a softening temperature of foamable polymer to generate gas and is hardly foamed in the process of forming the foam, as mentioned later, is selected properly in accordance with the composition thereof. The foaming agent that is foamed in a temperature range between about 120° C. and about 210° C. is preferably used.

At least one or two materials of these foaming agents can be selectively used. No particular limitation is imposed on a mixing ratio of the foaming agent. For example, a mixing ratio of the foaming agent to the foamable polymer is in the range of 5-50 parts by weight, or preferably in the range of 10-30 parts by weight, per 100 parts by weight of foamable polymer.

A quantity of foaming agent mixed is preferably in such a range that the foam sheet 2 containing the foaming agent, when foamed, practically generates a closed cell at about five to about twenty-five times, or preferably about ten to about twenty times, the foam ratio that the foam sheet containing no foaming agent does. When an excessively small quantity of foaming agent is mixed, the foam sheet 2 is not foamed sufficiently, while on the other hand, when an excessively large quantity of foaming agent is mixed, a resin drip of the foam obtained by the foaming is caused to thereby produce a void in the foam, both causing filling loss.

No particular limitation is imposed on the foam auxiliary agent. For example, a known foam auxiliary agent may be selected properly in accordance to the type of foaming agent used. To be more specific, for example, urea compounds containing urea as a main component including metal oxides, such as zinc oxide, and lead oxide, higher fatty acids, such as salicylic acid, and stearic acid, or metal salts thereof can be cited as the foam auxiliary agent. A metal salt of a higher fatty acid is preferably used.

At least one or two materials of these foam auxiliary agents can be selectively used. No particular limitation is imposed on a mixing ratio of the foam auxiliary agent. For example, a mixing ratio of the foam auxiliary agent to the foamable polymer is in the range of 1-20 parts by weight, or preferably in the range of 5-10 parts by weight, per 100 parts by weight of foamable polymer.

Further, known additives including, for example, stabilizer, stiffener, filler, and softener and, if required, for example, plasticizer, age resister, antioxidant, pigment, colorant, fungicide, and flame retardant, may be additionally mixed properly for intended purposes and applications, within the range of having little influence on the physical properties of the foam obtained.

The foam sheet 2 is produced in the following processes, for example. First, after the respective components cited above are mixed at a mixing ratio mentioned above, the mixture is kneaded using a mixing roll, a pressure kneader, and the like, to prepare the foaming material. Then, the resulting foaming material is continuously formed in sheet form by the continuous molding using a press, a calendar roll, or the like or by the extrusion using e.g. an extruder. Thereafter, the resulting sheet is processed into strips of a predetermined width to thereby produce the foam sheet 2.

When the foam sheet 2 is in the form of strip, the foam sheet 2 can be advantageously produced with improved production efficiency and at reduced costs by using the continuous molding.

The foam sheet 2 thus obtained is properly adjusted in thickness according to the structure form, while it is general that it has a thickness of 0.5-6.0 mm, or preferably 1.0-5.0 mm. When the foam sheet 2 has a thickness of less than 0.5 mm, there is the possibility that the foam sheet 2 cannot fill up the structural interspace or the interior space of hollow structure sufficiently. On the other hand, when the foam sheet 2 has a thickness of more than 6.0 mm, there is the possibility that it may be difficult to fit (insert) the foam sheet 2 in when the structural interspace or the interior space of hollow structure is narrow.

Also, the foam sheet 2 has a flexural modulus of 2-180 MPa, or preferably 2-150 MPa. By setting the flexural modulus of the foam sheet 2 within this range, adequate degree of flexibility and resilience are given to the foam sheet 2. When the foam sheet 2 has a flexural modulus of less than 2, there is the possibility that the foam sheet 2 may be slacked at the heating to incur failure in foam filling. On the other hand, when the foam sheet 2 has a flexural modulus of more than 180, it may increase in resilience so excessively that it may reduce in workability when fitted in the structure.

The clip 3 is formed of rigid resin and molded in one piece by the injection molding and the like. The clip 3 comprises a fixing portion 4 for fixing the foam sheet 2 in the interior space 22, and a retaining portion for retaining the foam sheet 2. The fixing portion 4 and the retaining portion 5 are integrally combined with each other.

The fixing portion 4 comprises a base portion 6, inner retaining portions 7 and a supporting portion 9, both projecting from the base portion 6, and outer retaining portions 8 projecting from the supporting portion 9 toward the inner retaining portions 7.

The base portion 6 is shaped like a generally rectangular plate to receive the foam sheet 2. The inner retaining portions 7 are in the form of thin, flexible sheet strips, which are formed on one side of the base portion 6 and project obliquely from both lengthwise ends of the base portion 6 to slant outwardly with respect to a longitudinal direction of the base portion 6.

The supporting portion 9 is formed on the one side of the base portion 6, projecting from a lengthwise center portion of the base portion 6 in a direction orthogonal to the longitudinal direction of the base portion 6.

The outer retaining portions 8 are in the form of thin, flexible sheet strips, which project obliquely from free ends of the supporting portion 9 toward the base portion 6 to slant outwardly with respect to the longitudinal direction of the base portion 6. As a result, free ends of the outer retaining portions 8 are arranged to confront each other at spaced locations from intermediate portions of the inner retaining portions 9.

The retaining portion 5 comprises insertion shafts 10 to project from the base portion 6 in a direction opposite to the projecting direction of the supporting portion 9, and head portions 11 provided at free ends of the insertion shafts 10. The insertion shafts 10 are in the form of a pair of halves 10A, 10B to provide a radial resilient force. These halves 10A, 10B are formed on the other side of the base portion 6, projecting from a lengthwise center portion of the base portion 6 to a direction orthogonal to the longitudinal direction of the base portion 6. The halves 10A, 10B are arranged to confront each other at spaced locations in the longitudinal direction of the base portion 6.

The head portions 11 at the free ends of the insertion shafts 10 (the halves 10A, 10B) are formed to protrude outwardly from peripheries the insertion shafts 10.

Then, the foam filling member 1 is shaped like a loop (in an endless form) by bending round the strip-like foam sheet 2 to form an overlapped portion 12 at which both lengthwise end portions of the foam sheet 2 are overlapped with and confront each other in the thickness direction. Then, the insertion shafts 10 of the clip 3 are inserted in the overlapped portion 12 to pass through it inwardly from outside of the looped portion in the thickness direction, so that the head portions 11 project inwardly thereof.

As a result, the overlapped portion 12 of the strip-like foam sheet 2 is held in sandwich relation between the base portion 6 of the clip 3 and the head portions 11 by the retaining portion 5, whereby the foam sheet 2 is kept in its looped shape.

The foam filling member 1 thus formed is fixed in an interspace of structure or an interior space of hollow structure by inserting the supporting portion 9 through the structure to hold the structure in sandwich relation between the inner retaining portions 7 and the outer retaining portions 8 and, then, is heated to a foaming temperature (e.g. about 120° C. to about 210° C.). Then, the foam filling member 1 is foamed and thereby the space is filled up without leaving any space therein. Hence, this foam filling member 1 is applicable as foam filling members of a variety of industrial fields, including, for example, vibration-proof material, noise insulation material, dust-proof material, heat insulating material, cushioning material, and water shutoff material, for the purposes of damping, noise reduction, dust control, heat insulation, shock-absorbing, and water tight, without being limited to any particular ones.

In addition, this foam filling member 1 can provide the result that the foam sheet 2 can be fixed in the space of structure by the fixing portion 4, while being kept in its looped shape by inserting the retaining portion 5 of the clip 3 through the overlapped portion 12 in the thickness direction. Specifically, according to this foam filling member 1, since the clip 3 can serve to not only fix the foam filling member 1 to the structure but also keep the foam sheet 2 in its looped shape, there is no need to use an additional member for keeping the foam sheet 2 in its looped shape. Hence, the foam sheet 2 can be held stably, while being kept in its looped shape, without any need to increase the number of components. Accordingly, improved vibration suppression and sound insulation can be provided.

To be more specific, when this foam filling member 1 is used for filling a hollow structure such as, for example, an interior space of a pillar of a vehicle by foaming the foam sheet, vibrations and noises of a vehicle engine or hissing sounds or fluttering sounds of the vehicle can be effectively prevented from being transmitted to the vehicle interior by the foam produced by foaming the foam sheet.

Next, a method of filling up the interior space of the pillar of the vehicle using this foam filling member 1 will be explained with reference to FIG. 3.

In this method, the foam sheet 2 is formed in a looped shape corresponding to a size of an interior space 22 of a pillar 21 to be filled and, then, the insertion shafts 10 of the retaining portion 5 is inserted through the overlapped portion 12, whereby the foam sheet 2 is held in place and kept in its looped shape corresponding in size to the interior space 22 by the retaining portion 5 of the clip 3.

Then, the foam filling member 1 is placed in the interior space of the pillar 21, as shown in FIG. 3(*a*). The pillar 21 comprises an inner panel 24 of a generally concave form in the cross-sectional view and an outer panel 25 of a generally concave form in the cross-sectional view. When the foam filling member 1 is set in the interior space of the pillar 21, the foam filling member 1 is fixed in the inner panel 24, first.

When the foam filling member 1 is fixed in the inner panel 24, the supporting portion 9 of the fixing portion 4 is inserted in a fixing hole 26 formed at a predetermined location of the inner panel 24 from inside of the inner panel 24 (on a side thereof opposite to the outer panel 25) toward outside of the same, while the outer retaining portions 8 are elastically bent against resiliency of the outer retaining portions 8 to come close to the supporting portion 9. Then, the outer retaining portion 8 and the supporting portion 9 are both exposed from the outer surface of the fixing hole 26.

Then, the outer retaining portions 8 are restored to original state to be away from the supporting portion 9 by their resiliency and are put into elastic contact with the outer surface of the inner panel 24. On the other hand, when the supporting portion 9 is put in the state of being inserted through the fixing hole 26, the inner retaining portions 7 are put into elastic contact with the inner surface of the inner panel 24. In other words, with the supporting portion 9 inserted in the fixing hole 26, the inner panel 24 is held in sandwich relation between the inner retaining portions 7 and the outer retaining portions 8 at a location close to the fixing hole 26. The fixing portion 4 of the clip 3 is fixed in the inner panel 24 in this manner.

Thereafter, the inner panel 24 in which the foam filling member 1 is fixed and the outer panel 25 are confronted with each other at their flange portions at both ends thereof and joined to each other by welding. As a result of this, the foam filling member 1 is fixed in the interior space 22 of the pillar 21 formed to have a closed cross section.

Then, after an inside surface of the pillar 21 is subjected to a rust-proof treatment, the foam filling member 1 is foamed, cross-linked, and cured by heating (at e.g. 110-190° C.) in a subsequent process such as, for example, a drying line process at the baking finish, to thereby produce the foam 23, whereby the interior space 22 of the pillar 21 is filled up with the foam 23, leaving no space therein, as shown in FIG. 3(b).

The shape, location, arrangement orientation, arrangement number, etc. of foams 23 are properly selected in accordance with the shape, size, etc, of the pillar 21. To be more specific, the pillar 21 serves as a front pillar, a side pillar, or a rear pillar of a vehicle body.

It is preferable that the foam 23 has a density (weight (g) of foam/volume ($cm^3$) of foam) of e.g. 0.04-0.2 $g/cm^3$, or preferably 0.05-0.1 $g/cm^3$. Also, it is preferable that the foaming material is foamed at a foam ratio of five to twenty-five times, or preferably ten to twenty times, to obtain the foam 23.

In this foam filling member 1, the foam sheet 2 can be previously kept in its looped shape corresponding in size to the interior space 22 of the pillar 21 by the clip 3. This can allow the foam sheet 2 to be placed stably in the interior space 22, with the size best suited to the interior space 22 of the pillar 21. This can prevent displacement of the foam sheet 2 so that the foam sheet 2 of a size best suited to the interior space 22 can be reliably foamed without losing the looped shape of the foam sheet 2. Hence, the interior space 22 can be filled up with the foam 23 surely and reliably, leaving no space therein.

Figure 4:
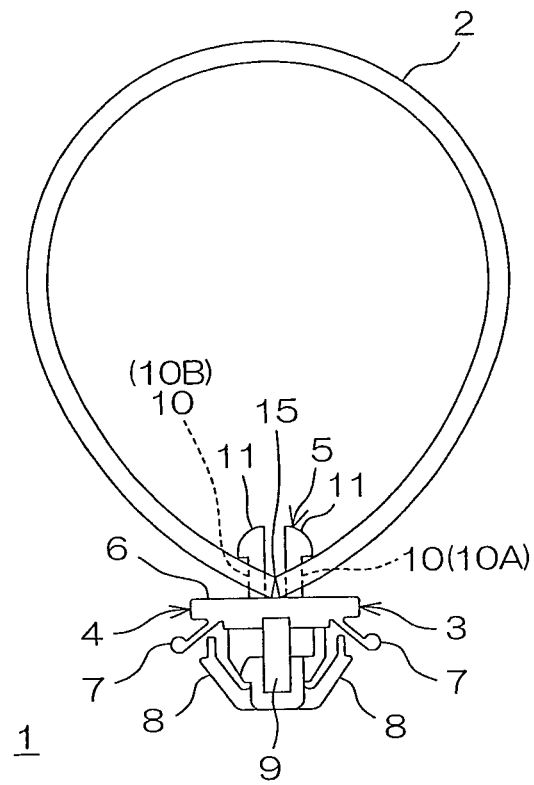
FIG. 4 is a front view showing the second embodiment of the foam filling member of the present invention.
Figure 5:
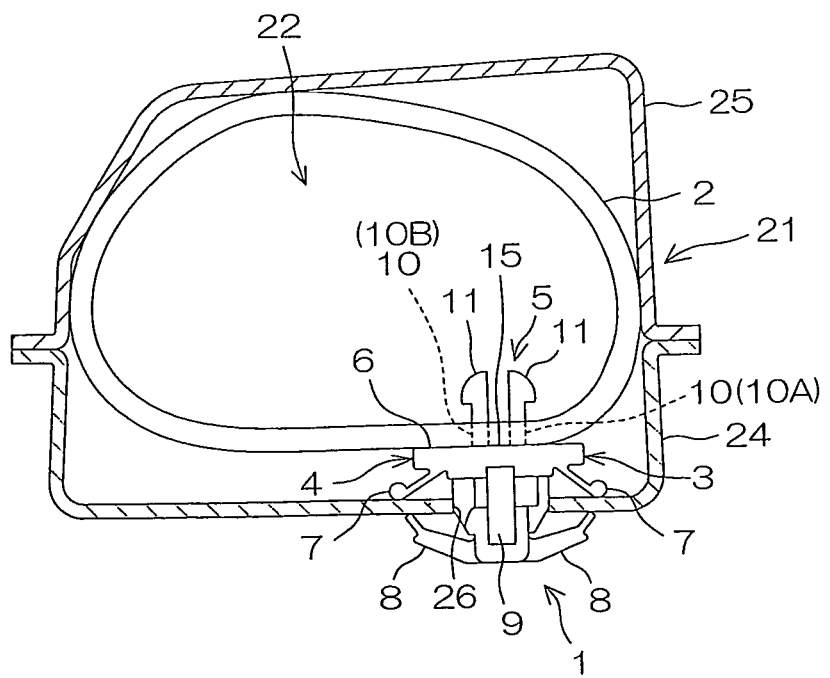
FIG. 5 is a cross-sectional view showing the state of the foam filling member shown in FIG. 4 being placed in the pillar.

FIG. 4 is a front view showing the second embodiment of the foam filling member of the present invention, and FIG. 5 is a cross-sectional view showing the state of the foam filling member shown in FIG. 4 being placed in the pillar. In FIGS. 4 and 5, like reference numerals refer to corresponding parts described above, while the explanation thereon is omitted.

In the foam filling member 1 of the first embodiment, the foam sheet 2 is formed in a looped shape to form an overlapped portion 12 at which both lengthwise end portions of the foam sheet 2 are overlapped with and confront each other in the thickness direction and, then, the insertion shafts 10 of the clip 3 are inserted in the overlapped portion 12 to pass through it in the thickness direction, whereby the foam sheet 2 is held in a looped shape by the clip 3. Alternatively, the foam sheet 2 can be held in the looped shape by the clip 3 without forming the overlapped portion 12, as shown in the second embodiment shown in FIG. 4, for example. In the second embodiment, the foam sheet 2 is shaped like a loop to form a confronted portion 15 where both lengthwise ends of the foam sheet 2 are opposed to and confronted with each other, and also halves 10A, 10B of the insertion shafts 10 of the clip 3 are extended through the lengthwise end portions of the foam sheet 2 in the thickness direction, whereby the foam sheet 2 can be kept in the looped shape by the clip 3.

Specifically, the foam filling member 1 shown in FIG. 4 is shaped like a loop (in an endless form) by bending round the strip-like foam sheet 2 to form a confronted portion 15 at which both lengthwise ends of the foam sheet 2 are opposed to and confronted to each other. Then, the halves 10A, 10B of the insertion shafts 10 of the clip 3 are inserted in the lengthwise end portions of the foam sheet 2 confronted to each other, to pass through them inwardly from outside of the looped portion in the thickness direction, so that the head portions 11 of the halves 10A, 10B project inwardly thereof.

As a result, the strip-like foam sheet 2 is held in sandwich relation between the base portion 6 and the head portions 11 of the clip 3 at the lengthwise end portions thereof with retaining by the retaining portion 5, whereby the foam sheet 2 is kept in its looped shape.

The foam filling member 1 of the second embodiment thus formed is also fixed in the interspace of structure or the interior space of hollow structure by inserting the supporting portion 9 through the structure to hold the structure in sandwich relation between the inner retaining portions 7 and the outer retaining portions 8 and, then, is heated to a foaming temperature (e.g. about 120° C. to about 210° C.). Then, the foam filling member 1 is foamed and thereby the space is filled up without leaving any space therein. Hence, this foam filling member 1 is also applicable as foam filling members of a variety of industrial fields, including, for example, vibration-proof material, noise insulation material, dust-proof material, heat insulating material, cushioning material, and water shutoff material, for their intended purposes, as mentioned above.

In addition, this foam filling member 1 can provide the result that the foam sheet 2 can be fixed in the space of structure by the fixing portion 4, while being kept in its looped shape by inserting the retaining portion 5 of the clip 3 through the lengthwise end portions in the thickness direction. Specifically, according to this foam filling member 1, since the clip 3 can serve to not only fix the foam filling member 1 to the structure but also keep the foam sheet 2 in its looped shape, there is no need to use an additional member for keeping the foam sheet 2 in its looped shape. Hence, the foam sheet 2 can be held stably, while being kept in its looped shape, without increasing the number of components. Accordingly, improved vibration suppression and sound insulation can be provided.

To be more specific, for example, the foam sheet 2 is formed in a looped shape corresponding to a size of the interior space 22 of the pillar 21 to be filled, using this foam filling member 1, and, then, the halves 10A, 10B of the insertion shafts 10 of the retaining portion 5 are inserted through the lengthwise end portions of the foam sheet 2, as shown in FIG. 5. Thereafter, the foam filling member 1 is placed in the interior space of the pillar 21 in the same manner as above. Then, the foam filling member 1 is foamed, cross-linked, and cured by heating (at e.g. 110-190° C.) in a subsequent process, such as, for example, the drying line process at the baking finish, to thereby produce the foam. This can produce the result that the interior space 22 of the pillar 21 can be filled up with the foam obtained, leaving no space therein, as is the case with above.

Figure 6:
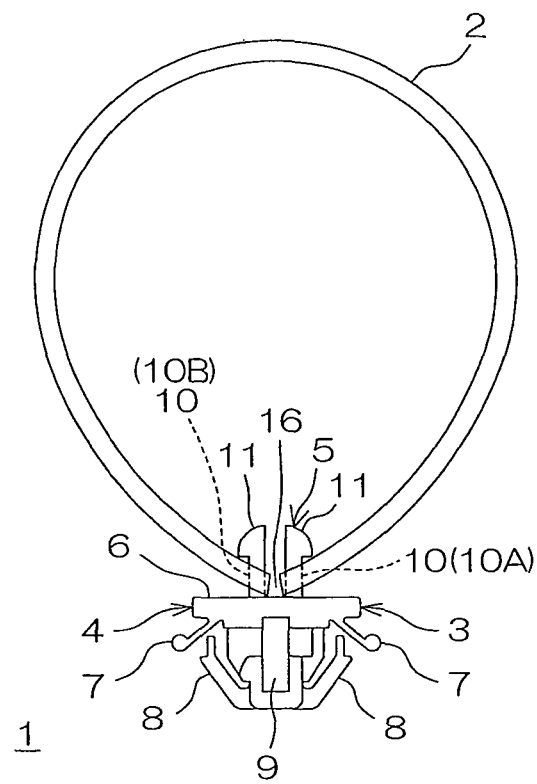
FIG. 6 is a front view showing the third embodiment of the foam filling member of the present invention.
Figure 7:
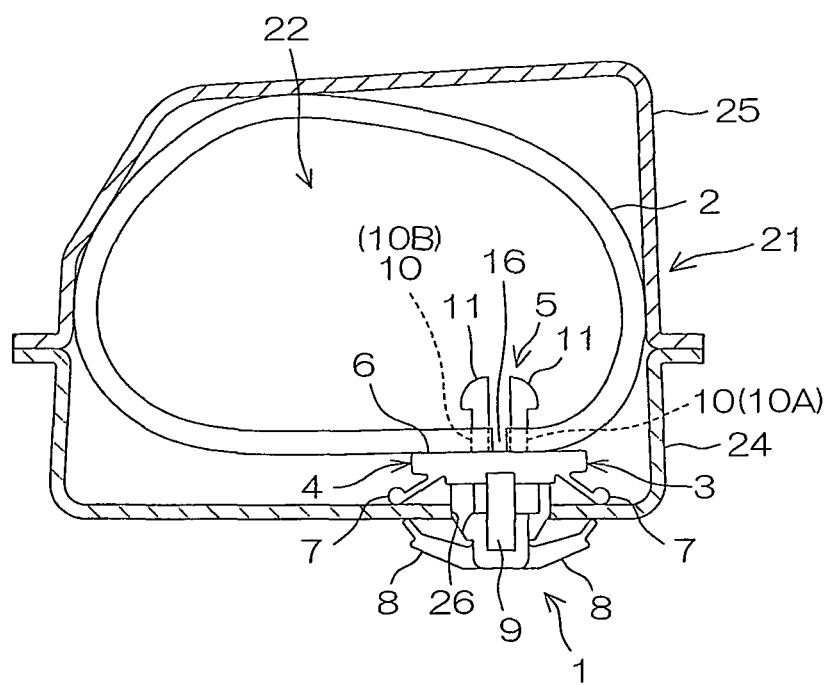
FIG. 7 is a cross-sectional view showing the state of the foam filling member shown in FIG. 6 being placed in the pillar.

FIG. 6 is a front view showing the third embodiment of the foam filling member of the present invention, and FIG. 7 is a cross-sectional view showing the state of the foam filling member shown in FIG. 6 being placed in the pillar. In FIGS. 6 and 7, like reference numerals refer to corresponding parts described above, while the explanation thereon is omitted.

As shown in the third embodiment of FIG. 6, for example, the foam sheet 2 is formed in a looped shape to form an opposed portion 16 at which both lengthwise end portions of the foam sheet 2 are spaced apart from and arranged to be opposed to each other and, then, halves 10A, 10B of the insertion shafts 10 of the clip 3 are extended through the lengthwise end portions of the foam sheet 2 in the thickness direction, whereby the foam sheet 2 is held in a looped shape by the clip 3.

Specifically, the foam filling member 1 shown in FIG. 6 is shaped like a loop (in an endless form) by bending round the strip-like foam sheet 2 to form the opposed portion 16 at which the both lengthwise ends of the foam sheet 2 are spaced apart from and arranged to be opposed to each other. Then, the halves 10A, 10B of the insertion shafts 10 of the clip 3 are inserted in the lengthwise end portions of the foam sheet 2 arranged to be opposed to each other, to pass through them inwardly from outside of the looped portion in the thickness direction, so that the head portions 11 of the halves 10A, 10B project inwardly thereof.

As a result, the strip-like foam sheet 2 is held in sandwich relation between the base portion 6 and the head portions 11 of the clip 3 at the lengthwise end portions thereof with retaining by the retaining portion 5, whereby the foam sheet 2 is kept in its looped shape.

The foam filling member 1 of the third embodiment thus formed is also fixed in the interspace of structure or the interior space of hollow structure by inserting the supporting portion 9 through the structure to hold the structure in sandwich relation between the inner retaining portions 7 and the outer retaining portions 8 and, then, is heated to a foaming temperature (e.g. about 120° C. to about 210° C.). Then, the foam filling member 1 is foamed and thereby the space is filled up without leaving any space therein. Hence, this foam filling member 1 is also applicable as foam filling members of a variety of industrial fields, including, for example, vibration-proof material, noise insulation material, dust-proof material, heat insulating material, cushioning material, and water shutoff material, as is the case with above.

In addition, this foam filling member 1 can provide the result that the foam sheet 2 can be fixed in the space of structure by the fixing portion 4, while being kept in its looped shape by inserting the retaining portion 5 of the clip 3 through the lengthwise end portions of the foam sheet 2 in the thickness direction. Specifically, according to this foam filling member 1, since the clip 3 can serve to not only fix the foam filling member 1 to the structure but also keep the foam sheet 2 in its looped shape, there is no need to use an additional member for keeping the foam sheet 2 in its looped shape. Hence, the foam sheet 2 can be held stably, while being kept in its looped shape, without increasing the number of components. Accordingly, improved vibration suppression and sound insulation can be provided.

To be more specific, for example, the foam sheet 2 is formed in a looped shape corresponding to a size of the interior space 22 of the pillar 21 to be filled, using this foam filling member 1, and, then, the halves 10A, 10B of the insertion shafts 10 of the retaining portion 5 are inserted through the lengthwise end portions of the foam sheet 2, as shown in FIG. 6. Thereafter, the foam filling member 1 is placed in the interior space of the pillar 21 in the same manner as above. Then, the foam filling member 1 is foamed, cross-linked, and cured by heating (at e.g. 110-190° C.) in a subsequent process, such as, for example, the drying line process at the baking finish, to thereby produce the foam. This can produce the result that the interior space 22 of the pillar 21 can be filled up with the foam obtained, leaving no space therein, as is the case with above.

Figure 8:
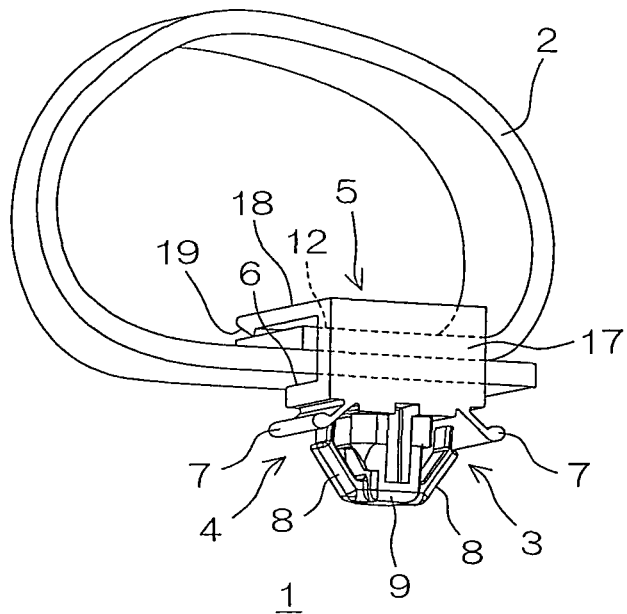
FIG. 8 is a front view showing the fourth embodiment of the foam filling member of the present invention.
Figure 9:
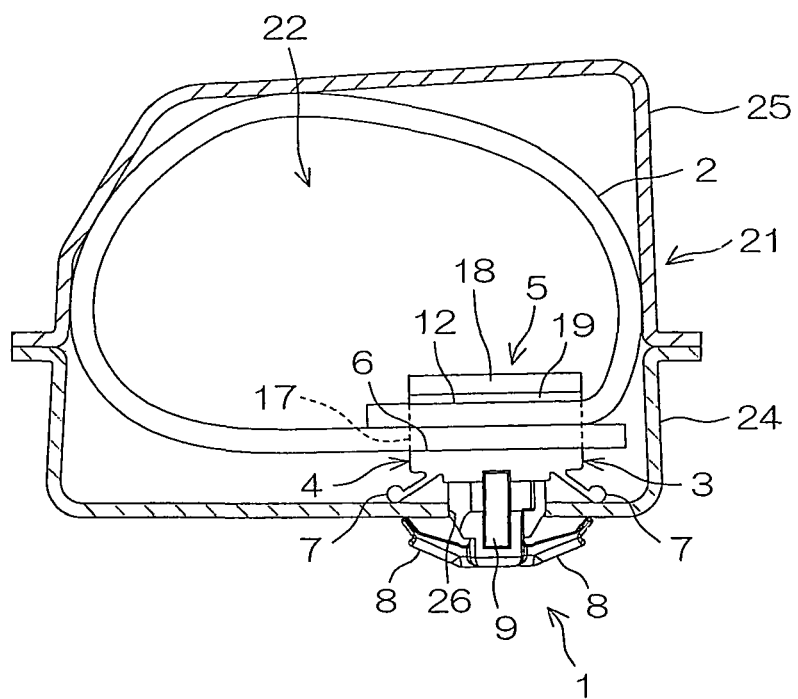
FIG. 9 is a cross-sectional view showing the state of the foam filling member shown in FIG. 8 being placed in the pillar.

FIG. 8 is a front view showing the fourth embodiment of the foam filling member of the present invention, and FIG. 9 is a cross-sectional view showing the state of the foam filling member shown in FIG. 8 being placed in the pillar. In FIGS. 8 and 9, like reference numerals refer to corresponding parts described above, while the explanation thereon is omitted.

As shown in the fourth embodiment of FIG. 8, for example, the retaining portion 5 of the clip 3 is formed in U-like shape in cross-section, combined with the base portion 6. In this embodiment also, the overlapped portion 12 of the foam sheet 2 can be held in sandwich relation in the thickness direction by such a retaining portion 5, to keep the foam sheet 2 in its looped shape by the clip 3.

Specifically, the retaining portion 5 of the clip 3 in the foam filling member 1 shown in FIG. 8 is not provided with the insertion shafts 10 and their head portions 11. As a substitute for there, the foam filling member 1 is provided with a side wall 17 shaped like a generally rectangular plate which projects from one end of the base portion 6 with respect to a direction orthogonal to the longitudinal direction of the base portion 6 in a direction opposite to the projecting direction of the supporting portion 9, and a top wall 18 shaped like a generally rectangular plate which extends from an upper end of the side wall 17 to confront the base portion 6 at a spaced interval. The side wall 17 and the top wall 18 are combined integrally with each other. Further, a pawl portion 19 of a generally triangular cross-section projecting toward the base portion 6 is provided at a free end of the top wall 18 on the side thereof confronting the base portion 6.

Specifically, the foam filling member 1 is shaped like a loop by bending round the strip-like foam sheet 2 to form the overlapped portion 12 at which the both lengthwise ends of the foam sheet 2 are overlapped with and opposed to each other in the thickness direction. Then, the retaining portion 5 is fitted onto the overlapped portion 12 along the widthwise direction of the foam sheet 2 to hold the overlapped portion 12 in sandwich relation between the pawl portion 19 at the top wall 18 and the base portion 6 in the thickness direction.

As a result, the foam sheet 2 is held in sandwich relation between the base portion 6 and the top wall 18 of the clip 3 at the overlapped portion 12 thereof with retaining by the retaining portion 5, whereby the foam sheet 2 is kept in its looped shape.

The foam filling member 1 of the fourth embodiment thus formed is also fixed in the interspace of structure or the interior space of hollow structure by the fixing portion 4 by inserting the supporting portion 9 through the structure to hold the structure in sandwich relation between the inner retaining portions 7 and the outer retaining portions 8 and, then, is heated to a foaming temperature (e.g. about 120° C. to about 210° C.). Then, the foam filling member 1 is foamed and thereby the space is filled up without leaving any space therein. Hence, this foam filling member 1 is also applicable as foam filling members of a variety of industrial fields, including, for example, vibration-proof material, noise insulation material, dust-proof material, heat insulating material, cushioning material, and water shutoff material, as is the case with above.

In addition, this foam filling member 1 can provide the result that the foam sheet 2 can be fixed in the space of structure by the fixing portion 4, while being kept in its looped shape, by holding the overlapped portion 12 of the foam sheet 2 in sandwich relation in the thickness direction by the retaining portion 5 of the clip 3. Specifically, according to this foam filling member 1, since the clip 3 can serve to not only fix the foam filling member 1 to the structure but also keep the foam sheet 2 in its looped shape, there is no need to use an additional member for keeping the foam sheet 2 in its looped shape. Hence, the foam sheet 2 can be held stably, while being kept in its looped shape, without increasing the number of components. Accordingly, improved vibration suppression and sound insulation can be provided.

To be more specific, for example, the foam sheet 2 is formed in a looped shape corresponding to a size of the interior space 22 of the pillar 21 to be filled, using this foam filling member 1, as shown in FIG. 9, and, then, the overlapped portion 12 of the foam sheet 2 is held in sandwich relation from the thickness direction by the retaining portion 5. Thereafter, the foam filling member 1 is placed in the interior space of the pillar 21 in the same manner as above. Then, the foam filling member 1 is foamed, cross-linked, and cured by heating (at e.g. 110-190° C.) in a subsequent process, such as, for example, the drying line process at the baking finish, to thereby produce the foam. This can produce the result that the interior space 22 of the pillar 21 can be filled up with the foam obtained, leaving no space therein, as is the case with above.

Figure 10:
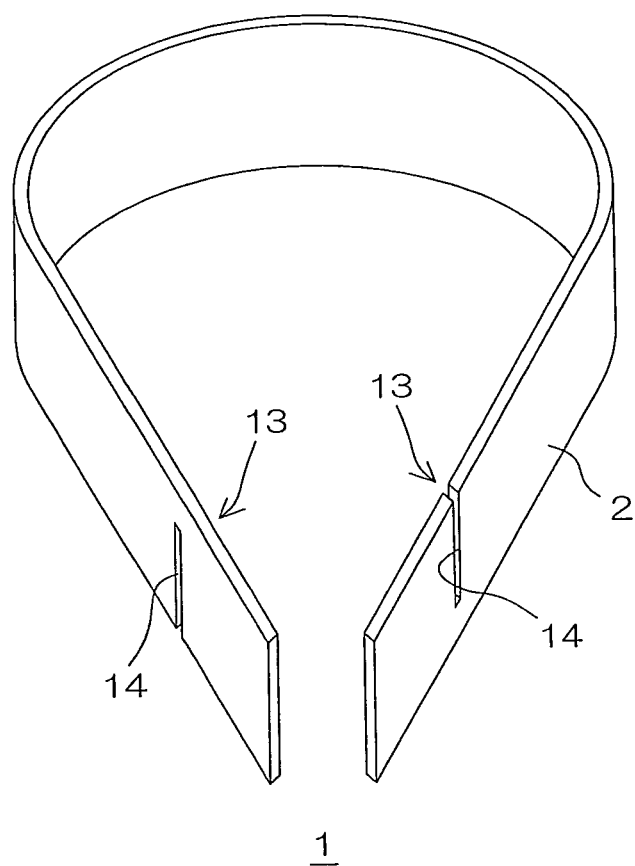
FIG. 10 is a perspective view of the foam filling member of the fifth embodiment of the present invention, showing the state before engagement of incisions.
Figure 11:
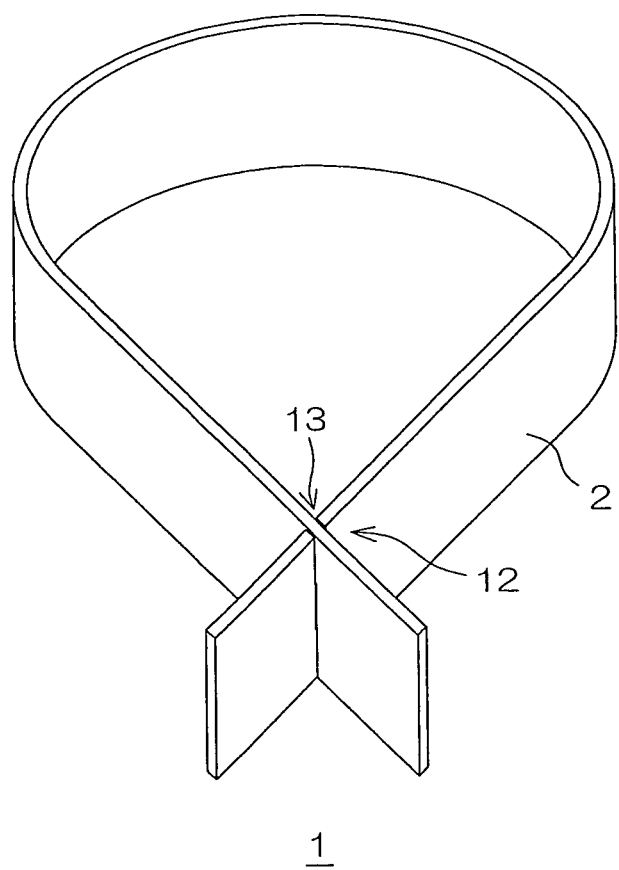
FIG. 11 is a perspective view of the foam filling member shown in FIG. 10, showing the state after engagement of the incisions.

FIG. 10 is a perspective view of the foam filling member of the fifth embodiment of the present invention, showing the state before engagement of incisions, and FIG. 11 is a perspective view of the foam filling member shown in FIG. 10, showing the state after engagement of the incisions.

Although the embodiment wherein the foam sheet 2 is kept in its looped shape by the retaining portion 5 of the clip 3 retaining the overlapped portion 12 of the foam sheet 2 have been described above, the need to use the retaining portion 5 of the clip 3 for holding the foam sheet 2 can be eliminated by provision of an engaging portion 13, serving as the retaining portion, in the foam sheet 2 itself, as the foam filling member 1 shown in the fifth embodiment of FIGS. 10 and 11.

Specifically, as shown in FIG. 10, the foam sheet 2 is Provided, at both lengthwise end portions thereof, with incisions 14 which cut in the foam sheet 2 partway along a widthwise direction thereof (a direction orthogonal to the longitudinal direction) from mutually widthwise opposite sides. The portions of the foam sheet 2 where these incisions 14 are formed serve as the engaging portions 13.

The foam filling member 1 is shaped like a loop (in an endless form) by bending round the strip-like foam sheet 2 to form an overlapped portion (an intersecting portion) 12 where both lengthwise ends of the foam sheet 2 are overlapped with each other at the intersecting position in the same manner as above, first. Then, the incisions 14 formed in the overlapped portion 12 are engaged into each other, to form the foam sheet into the loop, as shown in FIG. 11.

As a result of this, the foam sheet 2 is fixed by the incisions 14 in the overlapped portion 12 being engaged with each other and thus is kept in its looped shape.

Then, the foam filling member 1 thus formed is put into press-contact with the structure by the resilient force of the foam sheet 2, to be fixed in the interspace of structure or the interior space of hollow structure and, then, is heated to a foaming temperature (e.g. about 120° C. to about 210° C.). Then, the foam filling member 1 is foamed and thereby the space is filled up without leaving any space therein. Hence, this foam filling member 1 is also applicable as foam filling members of a variety of industrial fields, including, for example, vibration-proof material, noise insulation material, dust-proof material, heat insulating material, cushioning material, and water shutoff material, for the purposes of damping, noise reduction, dust control, heat insulation, shock-absorbing, and water tight, without being limited to any particular ones.

In this foam filling member 1, the foam sheet 2 can be kept in its looped shape by the engaging portions 13 formed in the overlapped portions 12 of the foam sheet 2. There is no need to use an additional member for keeping the foam sheet 2 in its looped shape. Hence, the foam sheet 2 can be held stably, while being kept in its looped shape, without increasing the number of components. Accordingly, improved vibration suppression and sound insulation can be provided.

When this foam filling member 1 is used for filling up the hollow structure such as, for example, the interior space of the pillar of the vehicle by foaming the foam sheet, vibrations and noises of a vehicle engine or hissing sounds or fluttering sounds of the vehicle can be effectively prevented from being transmitted to the vehicle interior by the foam produced by foaming the foam sheet.

Next, a method of filling up the interior space of the pillar of the vehicle will be explained with reference to FIG. 12. In FIG. 12, like reference numerals refer to corresponding parts to those of the embodiment illustrated above, while the explanation thereon is omitted.

In this method, the foam sheet 2 is formed in a looped shape corresponding to a size of an interior space 22 of a pillar 21 to be filled and then the incisions 14 are engaged with each other at the overlapped portion (the intersecting portion) 12, whereby the foam sheet 2 is kept in its looped shape corresponding to the size of the interior space 22.

Then, the foam filling member 1 is placed in the interior space 22 of the pillar 21, as shown in FIG. 12(*a*).

When the foam filling member 1 is placed in the interior space 22 of the pillar 21, the foam sheet 2 is put in press-contact with the inside surface of the pillar 21 by its resilient force so that it can be fixed in the interior space 22 of a closed cross section defined by joining together the inner panel 24 and the outer panel 25 by welding.

Then, after the inside surface of the pillar 21 is subjected to a rust-proof treatment, the foam filling member 1 is foamed, cross-linked, and cured by heating (at e.g. 110-190° C.) in a subsequent process such as, for example, the drying line process at the baking finish, to thereby produce the foam 23, whereby the interior space 22 of the pillar 21 is filled up with the foam 23, leaving no space therein, as shown in FIG. 12(*b*).

In this foam filling member 1, the foam sheet 2 can be previously kept in its looped shape corresponding in size to the interior space 22 of the pillar 21 by the engaging portions 13 provided in the foam sheet 2 in itself. This can allow the foam sheet 2 to be placed stably in the interior space 22, with the size best suited to the interior space 22 of the pillar 21. This can prevent displacement of the foam sheet 2 so that the foam sheet 2 of a size best suited to the interior space 22 can be reliably foamed without losing the looped shape of the foam sheet 2. Hence, the interior space 22 can be filled up with the foam 23 surely and reliably, leaving no space therein.

Although the embodiment wherein the engaging portion 13 is formed by the incisions 14 cut in partway along its entire width at the overlapped portion 12 has been described above, as long as the engaging portion 13 has the configuration that can allow the foam sheet 2 to be fixed in the overlapped portion 12 of the foam sheet 2, the engaging portion 13 is not limited to the one illustrated above. For example, the foam sheet 2 may have the configuration at both lengthwise end portions thereof that a deeper incision 14 is formed at one lateral end portion of the foam sheet 2, while on the other hand, no incision 14 is formed at the other lateral end portion of the foam sheet 2. Alternatively, the foam sheet 2 may have a number of mutually engageable incisions 14 formed at the both lengthwise end portions thereof.

Figure 14:
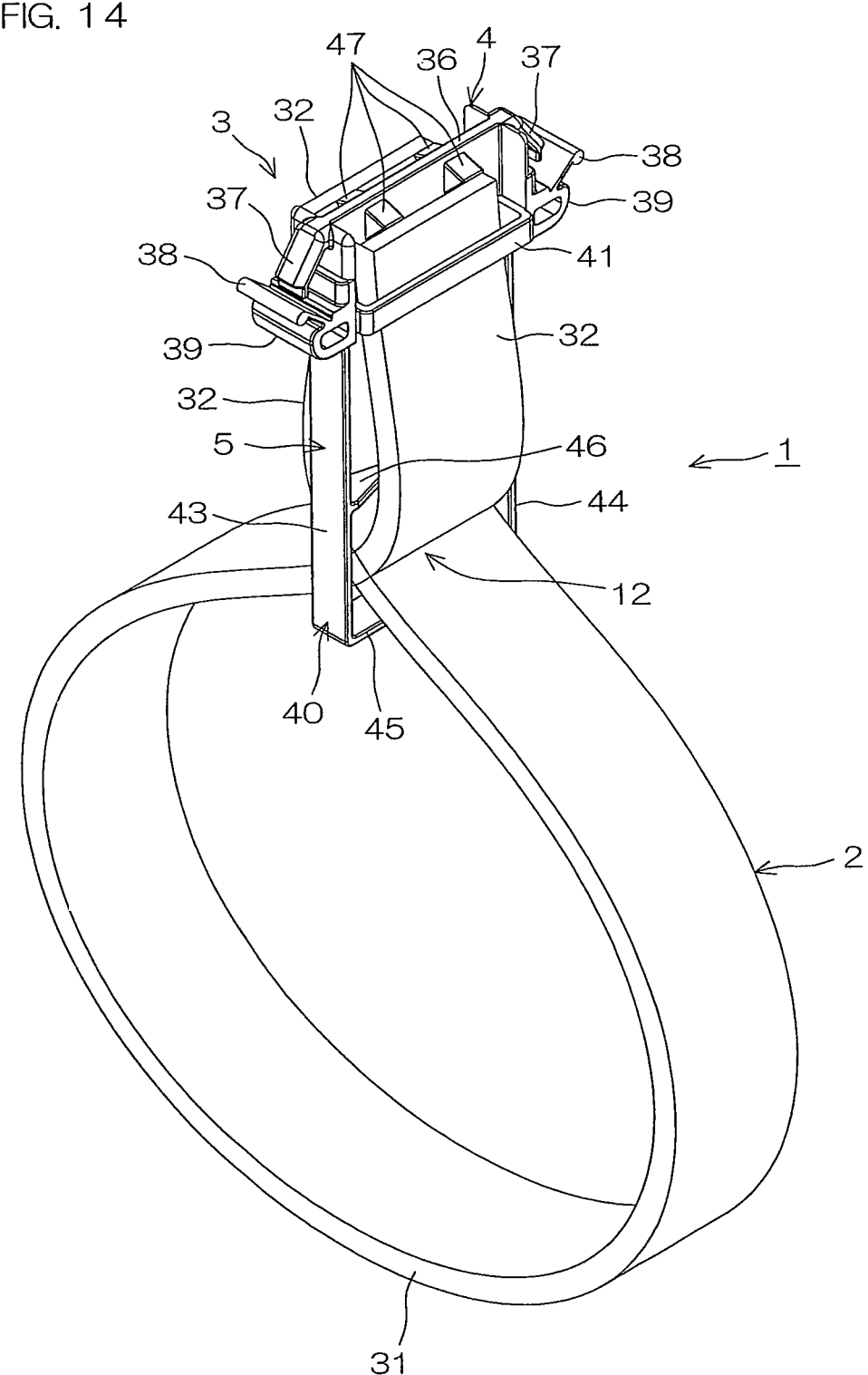
FIG. 14 is a perspective view showing the sixth embodiment of the foam filling member of the present invention.

FIG. 14 is a perspective view showing the sixth embodiment of the foam filling member of the present invention. In the explanation on FIG. 14, a right near side is defined as a front side, a left far side is defined as a rear side, a left near side is defined as a left side, and a right far side is defined as a right side (the same applies to FIG. 17).

In FIG. 14, this foam filling member 1 is used for forming the foam to be filled in the interspace of structure or in the interior space of hollow structure. The foam filling member 1 comprises the foam sheet 2, and the clip 3 serving as the fixing member for fixing the foam sheet 2 in the interspace of structure or in the interior space of hollow structure.

Figure 15:
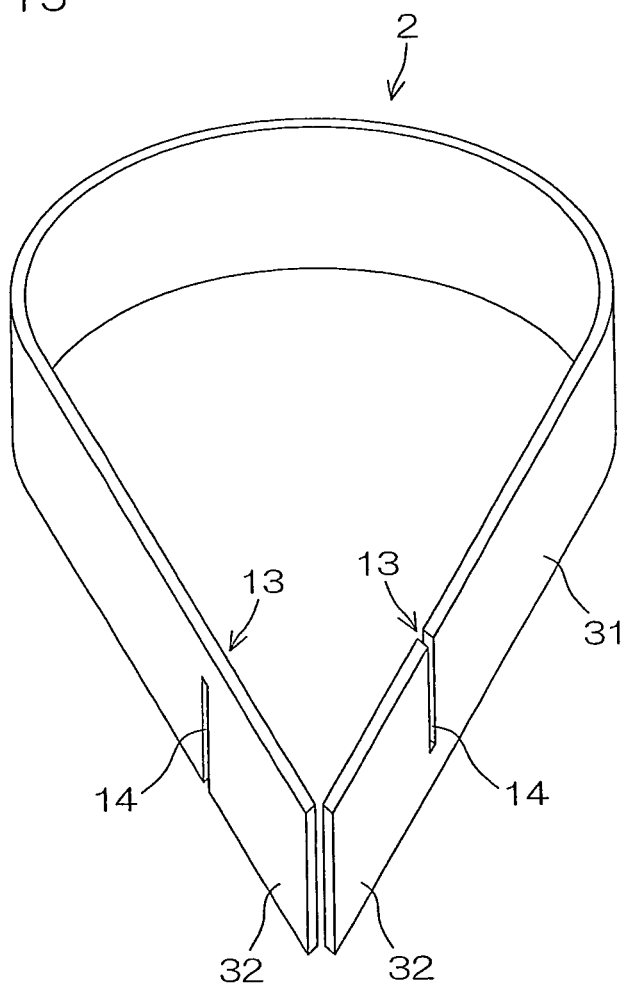
FIG. 15 is a perspective view of the foam sheet of the sixth embodiment, showing the state before engagement of incisions.
Figure 16:
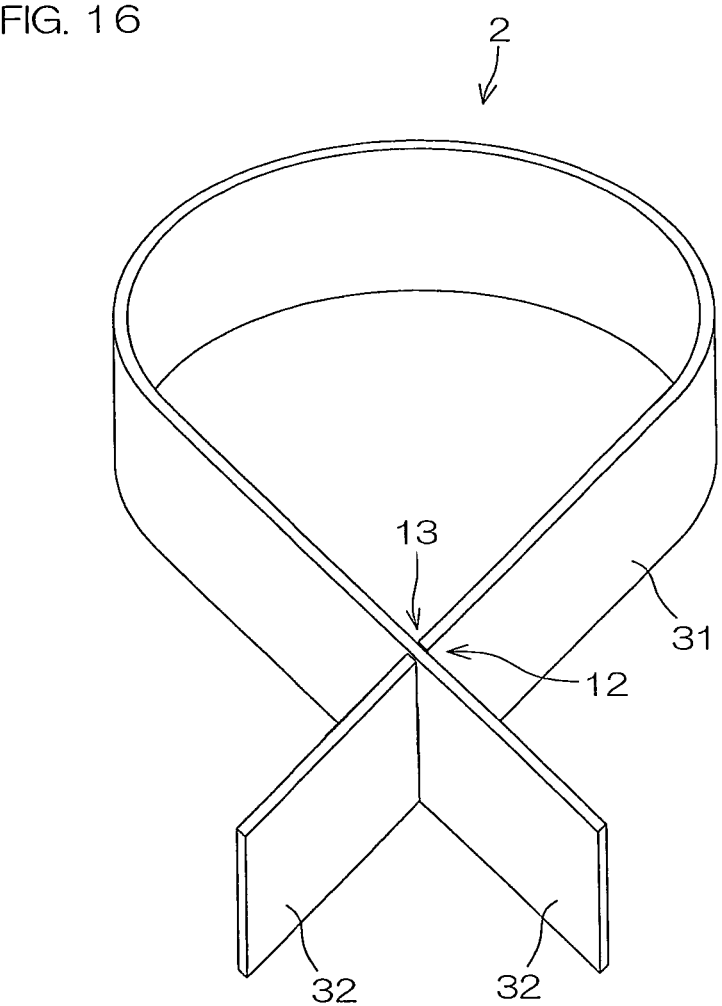
FIG. 16 is a perspective view of the foam sheet of the sixth embodiment, showing the state after engagement of the incisions.

FIG. 15 is a perspective view of the foam sheet 2 of the sixth embodiment, showing the state before engagement of incisions, and FIG. 16 is a perspective view of the foam sheet 2 of the sixth embodiment, showing the state after engagement of the incisions, The foam sheet 2 is the same as the one mentioned above. The foam sheet 2 is formed of foamable material which is foamed by heating (at e.g. about 120° C. to about 210° C.) and is shaped in an elongate sheet form.

The foam sheet 2 of the sixth embodiment has in general a thickness of 0.5-6.0 mm, or preferably 1.5-3.5 mm.

As shown in FIG. 15, the foam sheet 2 of the sixth embodiment is provided, at both lengthwise end portions thereof where the overlapped portion 12 is formed, with incisions 14 which cut in the foam sheet 2 partway along a widthwise direction thereof (a direction orthogonal to the longitudinal direction) from mutually widthwise opposite sides, as is the case with the foam sheet 2 of the fifth embodiment. The portions of the foam sheet 2 where these incisions 14 are formed serve as the engaging portions 13.

The foam filling member 1 is shaped like a loop by bending round the foam sheet 2 to form an overlapped portion (an intersecting portion) 12 where both lengthwise ends of the foam sheet 2 are overlapped with each other at the intersecting position, first. Then, the incisions 14 formed in the overlapped portion 12 are engaged in each other, as shown in FIG. 16. As a result of this, the foam sheet 2 is fixed by the incisions 14 in the overlapped portion 12 being engaged with each other and thus is kept in its looped shape. When the incisions 14 of the foam sheet 2 are put in engagement with each other, a looped portion 31 is formed on the center side of the foam sheet 2 with respect to the overlapped portion 12, while free end portions 32 are formed on the both-ends side of the foam sheet 2 with respect to the overlapped portion 12.

Although the embodiment wherein the engaging portion 13 is formed by the incisions 14 cut in partway along the widthwise direction at the overlapped portion 12 has been described above, as long as the engaging portion 13 has the configuration that can allow the foam sheet 2 to be fixed in the overlapped portion 12 of the foam sheet 2, the engaging portion 13 is not limited to the one illustrated above, as is the case with the foam sheet 2 of the fifth embodiment. For example, the foam sheet 2 may have the configuration at both lengthwise end portions thereof that a deeper incision 14 is formed at one lateral end portion of the foam sheet 2, while on the other hand, no incision 14 is formed at the other lateral end portion of the foam sheet 2. Alternatively, the foam sheet 2 may have a number of mutually engageable incisions 14 formed at the both lengthwise end portions thereof.

Figure 17:
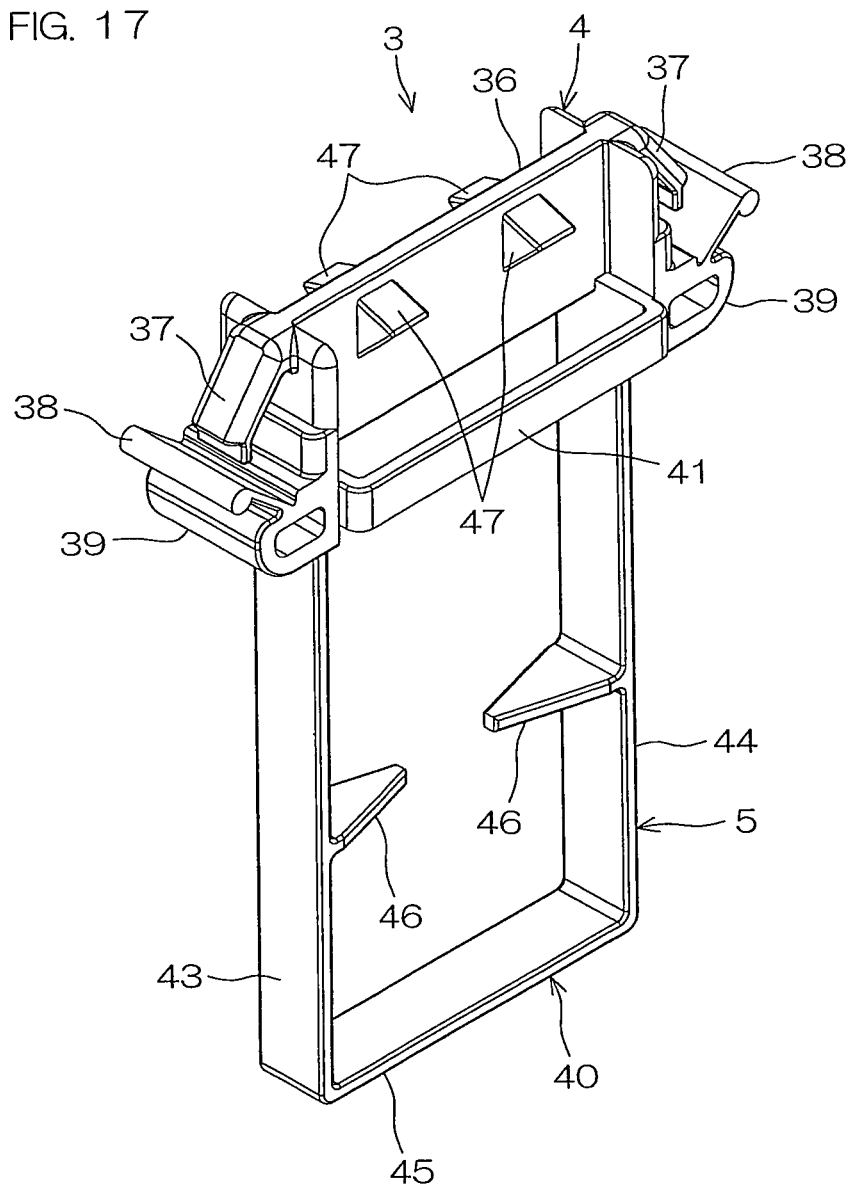
FIG. 17 is a perspective view of a clip of the sixth embodiment.
Figure 18:
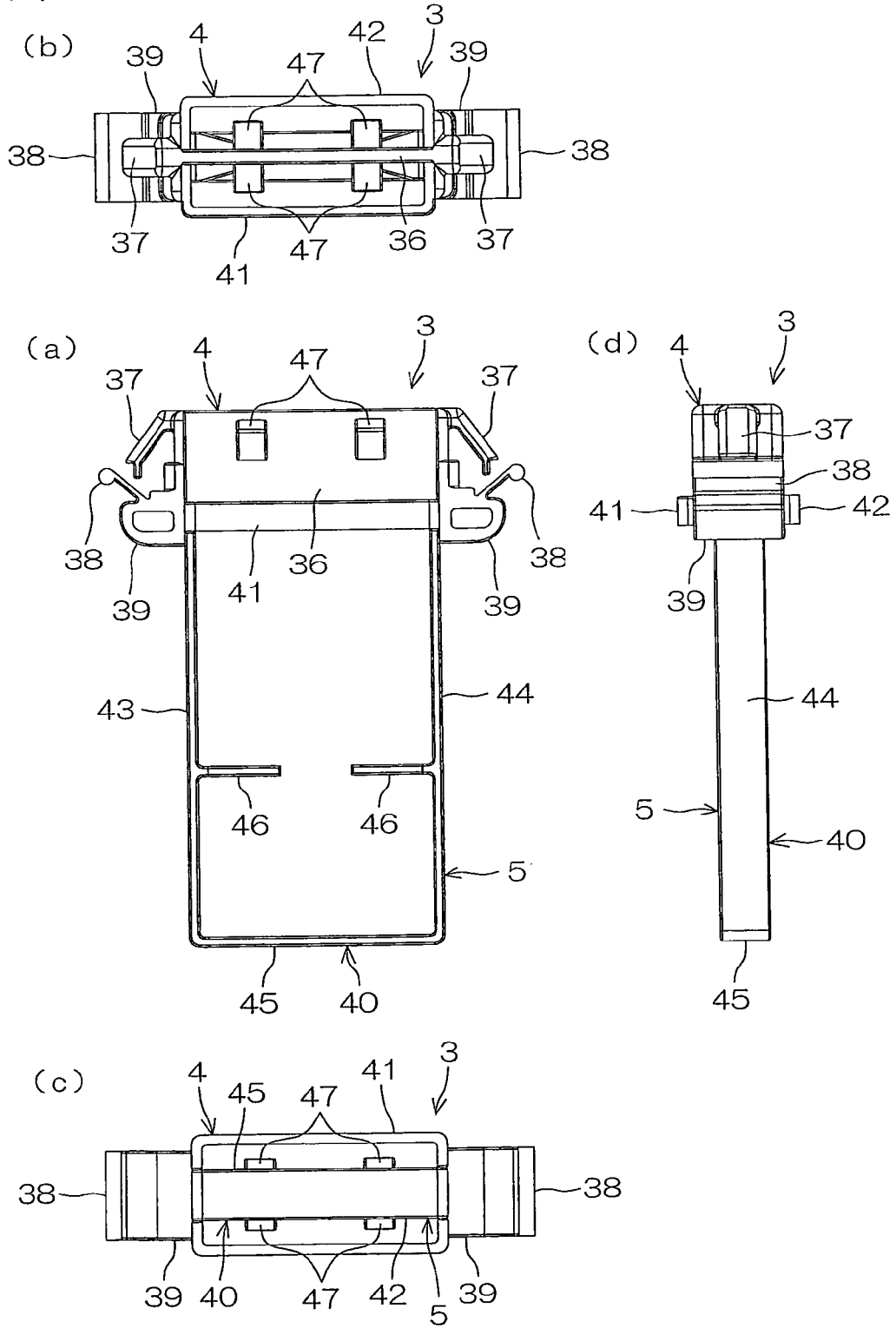
FIG. 18 is an orthographic drawing of the clip of the sixth embodiment, (a) showing a front view thereof, (b) showing a plane view thereof, (c) showing a bottom view thereof, and (d) showing a right side view thereof.

FIG. 17 is a perspective view of a clip of the sixth embodiment, and FIG. 18 is an orthographic drawing of the clip of the sixth embodiment, (a) showing a front view thereof, (b) showing a plane view thereof, (c) showing a bottom view thereof, and (d) showing a right side view thereof.

In FIGS. 17 and 18, the clip 3 is formed of rigid resin and molded in one piece to have a symmetrical appearance by the injection molding and the like. The clip 3 comprises a fixing portion 4 for fixing the foam sheet 2 in an interspace of structure or an interior space of hollow structure, and a retaining portion 5 for retaining the foam sheet 2. The fixing portion 4 and the retaining portion 5 are integrally combined with each other.

The fixing portion 4 comprises a base portion 36, inner retaining portions 37 and a supporting portion 39, both projecting from the base portion 36, and outer retaining portions 38 projecting from the supporting portion 39 in a direction confronting the inner retaining portions 37.

The base portion 36 is shaped like a generally rectangular plate which extends laterally. The inner retaining portions 37 are in the form of thin, flexible sheet strips which are formed to project obliquely downwardly from both lengthwise ends of the base portion 36 on the top side thereof to slant outwardly with respect to a longitudinal direction of the base portion 36. The supporting portion 39 is formed to project outwardly in the longitudinal direction of the base portion 36 from both lengthwise ends of the base portion 36 on the bottom side thereof. The outer retaining portions 38 are in the form of thin, flexible sheet strips which project obliquely upwardly from free ends of the supporting portion 39 toward the base portion 36 to slant outwardly in the longitudinal direction of the base portion 36. As a result, free ends of the inner retaining portions 37 are arranged to confront intermediate portions of the outer retaining portions 38 at spaced locations respectively.

The retaining portion 5 comprises a holding portion 40 of a generally U shape, both ends of which are connected to the two supporting portions 39, respectively, a front holding portion 41 extending between front ends of the two supporting portions 39, and a rear holding portion 42 extending between rear ends of the two supporting portions 39. When viewed from top, predetermined spaces (e.g. substantially equal to thickness of the foam sheet 2) are defined between the front holding portion 41 and a front surface of the base portion 36 and between the rear holding portion 42 and a rear surface of the base portion 36, respectively.

The holding portion 40 comprises a left side plate portion 43 and a right side plate portion 44 which extend downwardly from the two supporting portions 39, respectively, and a bottom plate portion 45 connecting between lower ends of the left and right side plates 43, 44. The left side plate portion 43 and the right side plate portion 44 has, on their surfaces confronting each other, lugs 46 projecting inwardly with respect to a confronting direction from portions thereof at around vertical center portions thereof. Each lug 46 is in the form of a thin, flexible strip having a generally triangular shape as viewed from top which becomes gradually narrowed toward the confronting direction. The lugs 46 are spaced apart from each other with a predetermined space defined between their tip ends.

This foam filling member 1 is shaped like a loop by bending round the strip-like foam sheet 2 to form the overlapped portion 12 where both lengthwise end portions of the foam sheet 2 are overlapped with in the thickness direction. Then, the overlapped portion 12 is placed in a generally rectangular space framed by the holding portion 40 and the fixing portion 4 of the clip 3. Then, one free end portion 32 of the foam sheet 2 is held in sandwich relation between the front holding portion 41 and the front surface of the base portion 36 so that it can be held in a freely slidable manner and also the other free end portion 32 of the foam sheet 2 is held in sandwich relation between the rear holding portion 42 and the rear surface of the base portion 36 so that it can be held in a freely slidable manner (Cf. FIG. 14).

As shown in FIG. 14, in the foam filling member 1, the overlapped portion 12 of the foam sheet 2 is placed to be in the space defined between the bottom plate portion 45 and the lugs 46 of the holding portion 40 of the clip 3. This arrangement can provide the result that when the foam sheet 2 slides downwardly, the bottom plate portion 45 of the clip 3 is brought into engagement with the overlapped portion 12 of the foam sheet 2, thus serving as a stop for regulating the slide of the foam sheet 2.

Figure 19:
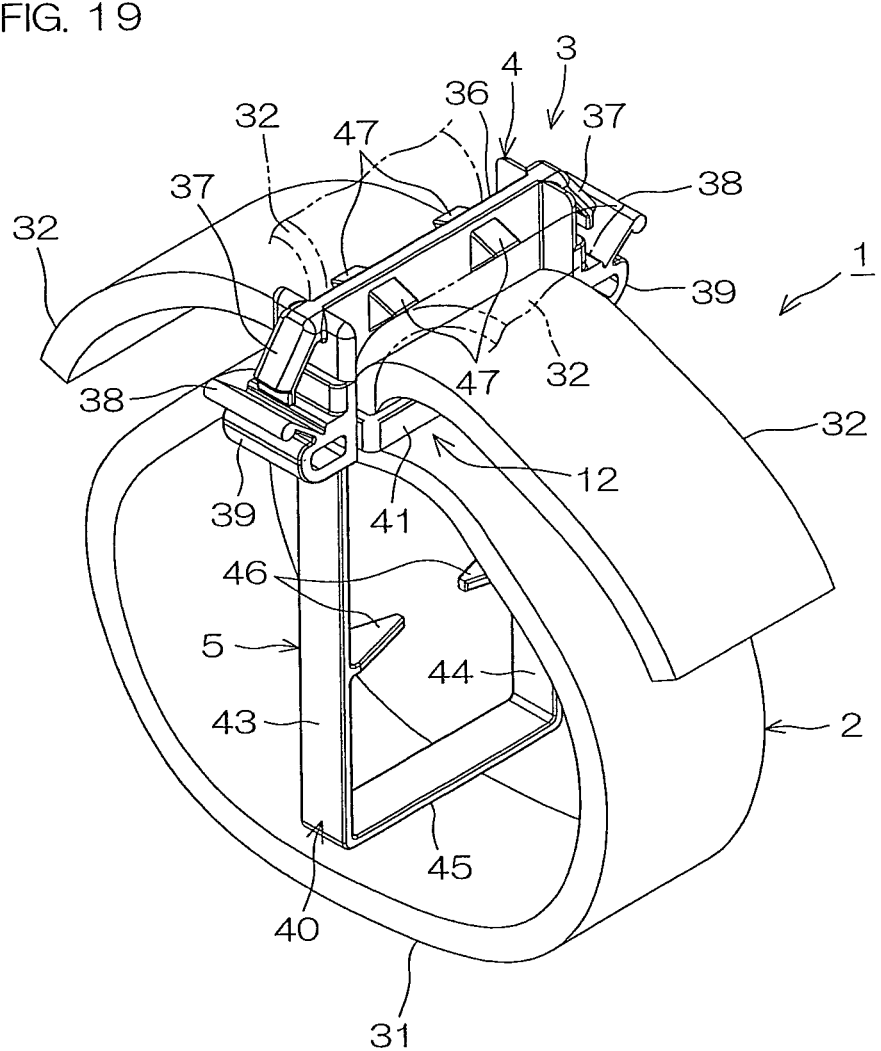
FIG. 19 is a perspective view of the foam filling member which is in the state of the foam sheet being slid upwardly from the state shown in FIG. 14.

When the foam sheet 2 slides upwardly from the state shown in FIG. 14, the one free end portion 32 of the foam sheet 2 slides upwardly, passing through the space between the front holding portion 41 and the front surface of the base portion 36, while also the other free end portion 32 of the foam sheet 2 slides upwardly, passing through the space between the rear holding portion 42 and the back surface of the base portion 36. Resultantly, the overlapped portion 12 of the foam sheet 2 moves over each lug 46 of the clip 3 and goes into the space between the fixing portion 4 and the lugs 46, followed by abutment with lower edges of the base portion 36, as shown in FIG. 19.

At this time, the one free end portion 32 of the foam sheet 2 slides toward the front side, while the other free end portion 32 of the foam sheet 2 slides toward the rear side. The two free end portions 32 of the foam sheet 2 are parted in two directions intersecting with the sliding direction, so that when the foam sheet 2 is slid upwardly, the respective free end portions 32 of the foam sheet 2 slide along the two directions intersecting with the sliding direction.

The base portion 36 of the clip 3 has lugs 47, serving as guide portions, formed on the front and rear surfaces thereof, respectively, two lugs 47 for each surface. Each lug 47 has a generally triangular shape, as viewed from side elevation, having a predetermined width with respect to the lateral direction. The two lugs 47 formed on the front surface of the base portion 36 are spaced from each other at spaced locations with respect to the lateral direction. These lugs 47 are put in sliding contact with both lateral edges of the one free end portion 32 of the foam sheet 2 sliding through the space between the front holding portion 41 and the front surface of the base portion 36. The two lugs 47 formed on the rear surface of the base portion 36 are spaced from each other at spaced locations with respect to the lateral direction. These lugs 47 are put in sliding contact with both lateral edges of the other free end portion 32 of the foam sheet 2 sliding through the space between the rear holding portion 42 and the rear surface of the base portion 36. This can provide the result that when the foam sheet 2 is slid upwardly, the free end portions 32 thereof are guided to each lug 47 to spread apart in the two directions intersecting with the sliding direction.

The foam filling member 1 of the sixth embodiment thus formed can be fixed in the interspace of structure or the interior space of hollow structure by inserting the fixing portion 4 in the structure to hold the structure in sandwich relation between the inner retaining portion 37 and the outer retaining portion 38. Also, the foam sheet 2 can be extended to two spaces formed on one side and on the other side with respect to the structure on which the fixing portion 4 is mounted by sliding the foam sheet 2 toward the fixing portion 4.

When heated to a foaming temperature (e.g. about 120° C. to about 210° C.), the foam sheet 2 is foamed and thereby the two spaces where the foam sheet 2 is placed are filled up without leaving any space therein. Hence, this foam filling member 1 of the sixth embodiment is also applicable as foam filling members of a variety of industrial fields, including, for example, vibration-proof material, noise insulation material, dust-proof material, heat insulating material, cushioning material, and water shutoff material, for the purposes of damping, noise reduction, dust control, heat insulation, shock-absorbing, and water tight, without being limited to any particular ones.

To be more specific, when this foam filling member 1 of the sixth embodiment is used for filling up the hollow structure such as, for example, an interior space of the pillar of the vehicle by foaming the foam sheet 2, vibrations and noises of a vehicle engine or hissing sounds or fluttering sounds of the vehicle can be effectively prevented from being transmitted to the vehicle interior by the foam produced by foaming the foam sheet 2.

Figure 20:
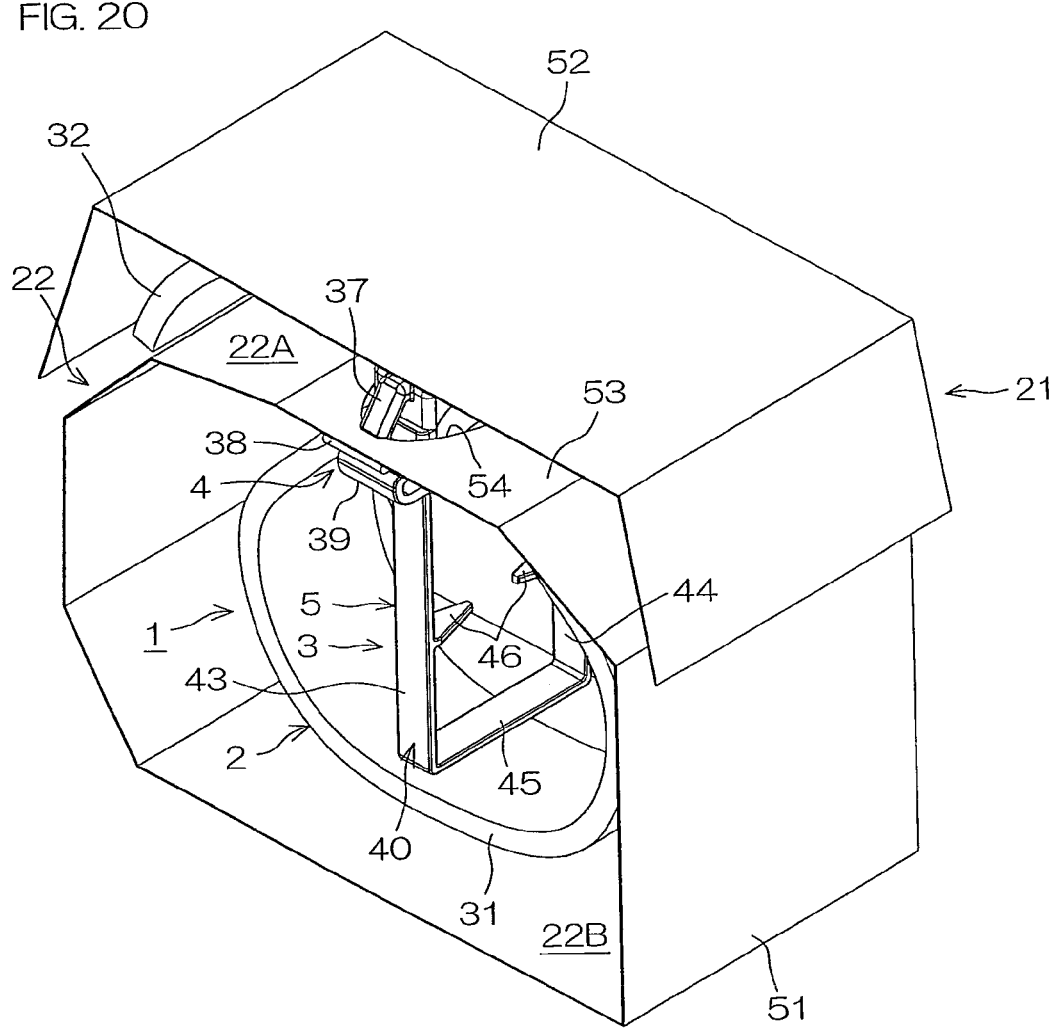
FIG. 20 is a perspective view showing an embodiment of the way of filling the interior space of the pillar of the automobile with the foam filling member of the sixth embodiment.
Figure 21:
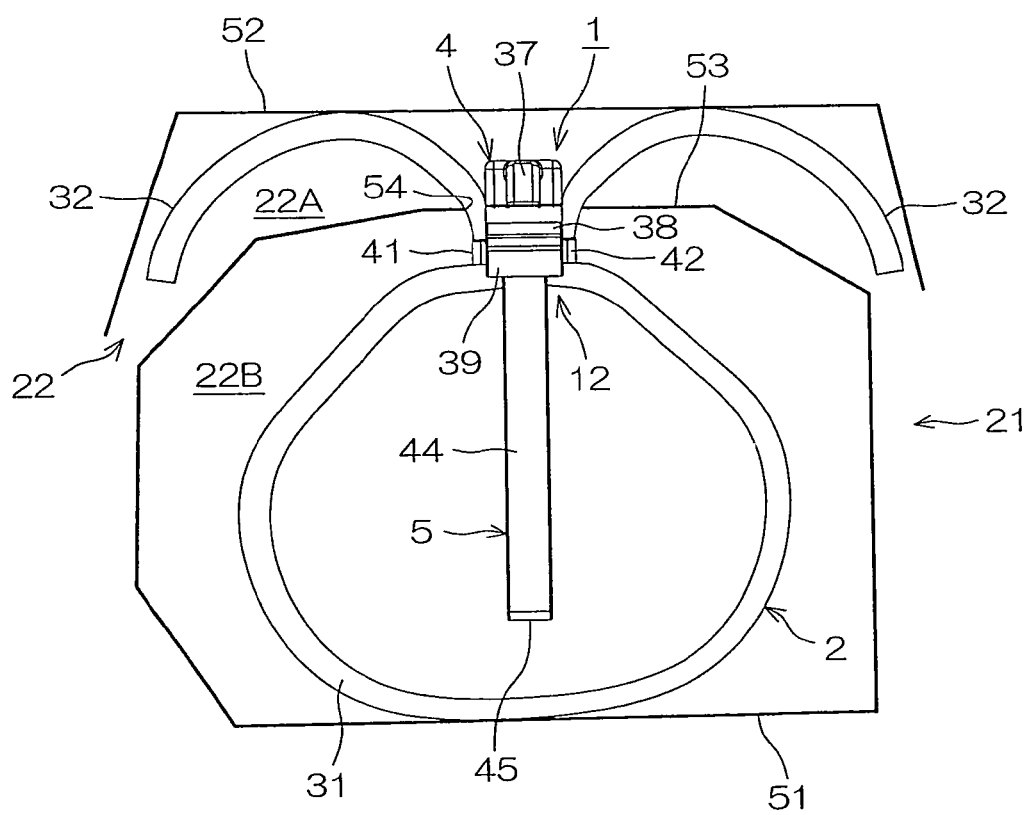
FIG. 21 is a right side view of the foam filling member and the pillar shown in FIG. 20.

FIG. 20 is a perspective view showing an embodiment of the way of filing up the interior space of the pillar of the vehicle with the foam filling member of the sixth embodiment, and FIG. 21 is a right side view of the foam filling member and the pillar shown in FIG. 20.

Next, a method of filling up the interior space 22 of the pillar 21 of the vehicle with the foam filling member 1 of the sixth embodiment will be explained with reference to FIGS. 20 and 21. In FIGS. 20 and 21, for making the foam filling visually understandable, only an area of the pillar 21 near the foam filling member 1 mounting portion of the pillar 21 is shown and the rest of the areas of the pillar 21 is omitted.

This foam filling member 1 is applied to e.g. a pillar 21 having a double structure comprising a cylindrical inner panel 51, and an outer panel 52 located outside of the inner panel 51 and defining a predetermined space between the inner panel 51 and the outer panel 52. Such a pillar 21 comprises a first space 22A formed between the inner panel 51 and the outer panel 52, and a second space 22B formed in the interior of the inner panel 51. A part of the inner panel 51 confronting the outer panel 52 serves as a partition wall 53 between the first space 22A and the second space 22B.

In this method, the foam sheet 2 is shaped like a loop corresponding to a size of an interior space 22 (the first space 22A and the second space 22B) of a pillar 21 to be filled, first. Then, as shown in FIG. 14, the overlapped portion 12 of the foam sheet 2 is placed in the space between the bottom plate portion 45 and lugs 46 of the holding portion 40 of the clip 3. Also, the one free end portion 32 of the foam sheet 2 is held in sandwich relation between the front holding portion 41 and the front surface of the base portion 36 so that it can be held in a freely slidable manner, while the other free end portion 32 of the foam sheet 2 is held in sandwich relation between the rear holding portion 42 and the rear surface of the base portion 36 so that it can be held in a freely slidable manner.

Then, the foam filling member 1 is placed in the interior space 22 of the pillar 21. When the foam filling member 1 is placed in the interior space 22 of the pillar 21, the foam filling member 1 is fixed in the inner panel 51, first. Specifically, the fixing portion 4 of the clip 3 is inserted in a fixing hole 54 formed in the partition wall 53 of the inner panel 51 from inside of the inner panel 51 toward outside (the outer panel 52 side) of the same, while the free end portions of the inner retaining portions 37 are elastically bent against resiliency of the inner retaining portions 37 to come close to the base portion 36. Then, the inner retaining portions 37 and the top portion of the base portion 36 are both exposed from outer of the fixing hole 54. Then, the inner retaining portions 37 are restored to original state so that the free end portions are away from the base portion 36 by the resiliency and are put into elastic contact with the outer surface of the inner panel 51. On the other hand, when the base portion 36 is put in the state of being inserted through the fixing hole 54, the outer retaining portions 38 are put into elastic contact with the inner surface of the inner panel 51. In other words, with the base portion 36 inserted in the fixing hole 54, the inner panel 51 is held in sandwich relation between the inner retaining portions 37 and the outer retaining portions 38 at a location close to the fixing hole 54. The fixing portion 4 of the clip 3 is fixed in the inner panel 51 in this manner.

Thereafter, the foam sheet 2 is slid upwardly. Then, the overlapped portion 12 of the foam sheet 2 moves over each lug 46 of the clip 3 and goes into the space between the fixing portion 4 and the lugs 46, followed by abutment with the lower edges of the base portion 36, as shown in FIGS. 20 and 21. As a result, the one free end portion 32 of the foam sheet 2 slides upwardly, passing through the space between the front holding portion 41 and the front surface of the base portion 36, while also the other free end portion 32 of the foam sheet 2 slides upwardly, passing through the space between the rear holding portion 42 and the rear surface of the base portion 36. At this time, as depicted by a chain double dashed line of FIG. 19, the two free end portions 32 of the foam sheet 2 are guided by the lugs 47 of the clip 3 to be split apart slantwise in a V-like shape. Then, when the foam sheet 2 is slid further, the free end portions 32 are brought into contact with the outer panel 52 and then are curved so that their tips come near the looped portion 31, as depicted by a solid line of FIG. 19.

Thus, each free end portion 32 of the foam sheet 2 is located in the first space 22A located on one side with respect to the fixing portion 4 so that they can be spread apart in mutually opposite directions, and the looped portion 31 of the foam sheet 2 is located in the second space 22B located on the other side with respect to the fixing portion 4. In this state, the foam sheet 2 is in the state of extending between the first space 22A and the second space 22B.

The inner panel 51 may be formed in a cylindrical shape, for example, by joining together two segments. This inner panel 51 may be formed in such a manner that after the foam filling member 1 is fixedly fitted in the fixing hole 54 formed in one segment, the one segment and the other segment are arranged opposite to each other and joined together by welding.

The outer panel 52 may be joined directly to an outside surface of the inner panel 51, for example, by welding and the like, or may alternatively be positioned to cover the entirety of the inner panel 51, with the entirety of its inside surface spaced apart from the entirety of an outside surface of the inner panel 51.

Then, after the inside surface of the pillar 21 is subjected to the rust-proof treatment, the foam filling member 1 is foamed, cross-linked, and cured by heating (at e.g. 110-190° C.) in a subsequent process such as, for example, the drying line process at the baking finish, to thereby produce the foam, whereby the first space 22A and the second space 22B of the pillar 21 is filled up with the foam, leaving no space therein.

In this foam filling member 1 of the sixth embodiment, the foam sheet 2 can be slid with respect to the clip 3 in the state of being fixed in the space of the structure, such as the pillar 21, by the clip 3. This can allow the foam sheet 2 to be moved to a desired fixing position by sliding the foam sheet 2 with respect to the clip 3, thus facilitating the assembling work.

Also, in this foam filling member 1 of the sixth embodiment, the foam sheet 2 can be arranged to extend between the first space 22A and the second space 22B by simply sliding the foam sheet 2 toward the one side (upper side) with respect to the fixing portion 4 after the fixing portion 4 of the clip 3 is fixed in the structure, such as the pillar 21. This arrangement can facilitate the assembling work, as compared with the arrangement wherein the foam filling members are placed in the first space 22A and the second space 22B, respectively.

Further, in this foam filling member 1 of the sixth embodiment, when the foam sheet 2 is slid toward the one side (toward the first space 22A) with respect to the fixing portion 4, the free end portions 32 of the foam sheet 2 are slid along two directions intersecting with the sliding direction. This can allow the foam sheet 2 to go into the space (first space 22A) located on the one side with respect to the fixing portion 4 over the wide range, thus providing improved vibration suppression and sound insulation.

In addition, in this foam filling member 1 of the sixth embodiment, when the foam sheet 2 is slid toward the one side (toward the first space 22A) with respect to the fixing portion 4, the free end portions 32 of the foam sheet 2 can be spread apart in two directions intersecting with the sliding direction along the lugs (guide portion) 47 of the clip 3. This can allow the foam sheet 2 to go into the space (first space 22A) located on the one side with respect to the fixing portion 4 over the wide range, thus facilitating the assembling work.

Further, in this foam filling member 1 of the sixth embodiment, although a relatively small amount of foamable material can be used for the foam sheet 2, since the foam sheet 2 is shaped like a loop, a central portion of the foam sheet 2 can lie over a wide area of the space (second space 22B) located on the other side with respect to the fixing portion 4 and also both end portions of the foam sheet 2 can go into the space (first space 22A) located on the one side with respect to the fixing portion 4 over the wide range. Hence, an amount of foamable material used can be reduced and cost cut can also be achieved.

In this foam filling member 1, since the foam sheet 2 can be previously kept in its looped shape corresponding in size to the interior space 22 (first space 22A and second space 22B) of the pillar 21 by the clip 3, the foam sheet 2 can be placed stably in the interior space 22 of the pillar 21, with the size best suited to the interior space 22 of the pillar 21. This can prevent losing of the looped shape of the foam sheet 2 caused by displacement of the foam sheet 2 and can also allow reliable foaming of the foam sheet 2 with its size best suited to the interior space 22. Hence, the interior space 22 can be filled up with the foam 23 surely and reliably, leaving no space therein.

Further, in this foam filling member 1 of the sixth embodiment, when an external force acting to the other side (downward) with respect to the fixing portion 4 acts on the foam sheet 2 during the assembling work, the foam sheet 2 can be prevented from being slid and dropped off from the clip 3 by the bottom plate portion (stop) 45. Thus, the foam sheet 2 can be prevented from being dropped off from the clip 3 during the assembling work, thus facilitating the assembling work.

The foam filling member 1 of the sixth embodiment is not limited to the contents of any one of the embodiments illustrated above. For example, as long as the foam filling member 1 is structured so that the foam sheet 2 can be held in a freely slidable manner with respect to the clip 3, the foam sheet 2 may be formed in any other shape without being limited to the looped shape.

Also, the foam filling member 1 of the sixth embodiment is not limited to the application to the pillar 21 having a double structure. The foam filling member 1 may be used for forming the foam to fill up the interior space of the pillar of a different shape. Also, it may be used for forming the foam to fill up the interspace of the other structure than the pillar or the interior space of hollow structure.

Example

While in the following, the present invention will be described in further detail with reference to Examples, the present invention is not limited thereto.

1) Preparation of Foam Filling Member

After components of foamable polymer, crosslinking agent, and foaming agent were mixed in accordance with the blending prescription shown in FIG. 1, the mixture obtained was kneaded at a rotation speed of 20 min$^{-1}$ at 110° C. using a mixing roll, to prepare foaming material. Then, the foaming material was press molded for one minute at 110° C. and formed into a sheet having thickness of 5 mm, using a hot press. The sheet was cut to strips of 175 mm long and 15 mm wide, to produce the foam sheet strips of Examples 1-6. The flexural modulus of the foam sheet strips of Examples are shown in TABLE 1.

Then, each foam sheet strip was shaped like a loop by bending the foam sheet to form an overlapped portion at which both lengthwise end portions of the foam sheet were overlapped with each other in the thickness direction. Then, the clip formed of nylon was inserted in the overlapped portion, passing through it inwardly from outside of the endless portion in the thickness direction, to thereby produce the foam filling members of Examples.

The foam filling members thus produced correspond to the foam filling member of the first embodiment illustrated above.

2) Fixing of Foam Filling Member to Pillar and Foaming of the Same

Figure 13:
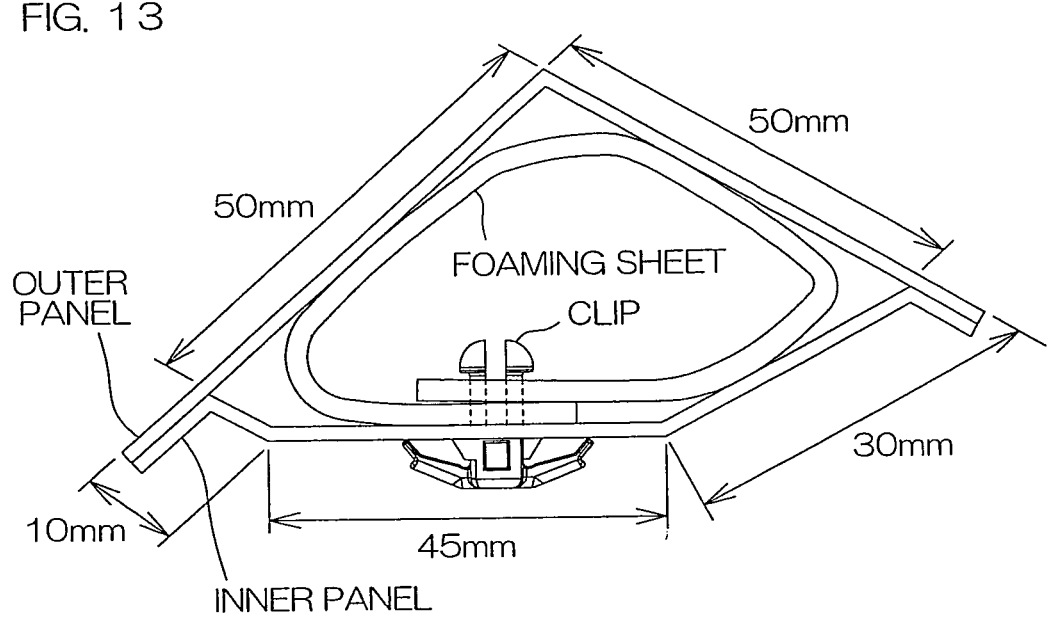
FIG. 13 is a cross-sectional view showing dimensions of the pillar used in the examples.

The foam filling member of each Example thus obtained was fixed in the interior space of the pillar having a size shown in FIG. 13 via the clip and then was foamed to fill up the interior space.

To be more specific, the foam filling member of the each. Example was fixed to the inner panel via the clip, first. Then, after the outer panel was laid on the inner panel, flanges of the inner panel and outer panel provided at both ends were confronted with each other and joined together by welding. The workability in mount of the foam filling members of Examples on the pillars (easiness for mount of the foam sheet on the pillar against resilience) was evaluated. The results are shown in TABLE 1. In the evaluation, the mark ○ indicates Excellent, and the mark Δ indicates Ordinary.

Then, the pillars on which the foam filling members were mounted were put in the oven for twenty minutes at 160° C., to foam the foam sheets in the pillars. Then, the foam filling for the interior space of the pillar was evaluated by visual inspection. The results are shown in TABLE 1. In the evaluation, the mark ○ indicates Excellent, and the mark Δ indicates Ordinary.

TABLE 1

| | Material | Name of article | Manufacturer | Ex. 1 | Ex. 2 | Ex. 3 | Ex. 4 | Ex. 5 | Ex. 6 |
|---|---|---|---|---|---|---|---|---|---|
| Foamable polymer *1 | EVA | EVAFLEX EV40LX | DU PONT-MITSUI POLYCHEMICALS | 100 | — | — | — | — | — |
| | EVA | EVAFLEX EV460 | DU PONT-MITSUI POLYCHEMICALS | — | 100 | — | — | — | — |
| | EVA | ULTRASEN 543 | Tosoh | — | — | 100 | — | — | — |
| | EVA | ULTRASEN 511F | Tosoh | — | — | — | 100 | — | — |
| | EVA | ULTRASEN 760 | Tosoh | — | — | — | — | 100 | — |
| | PE | SUMIKASEN G210 | Sumitomo Mitsui Polyolefin | — | — | — | — | — | 100 |
| Cross-linking agent | DCP *2 | PARCUMYL D-40MBK | NOF Corporation | 5 | 5 | 5 | 5 | 5 | 5 |
| Foaming agent | OBSH *3 | CELMIKE SX | SANKYO KASEI | 20 | 20 | 20 | 20 | 20 | 20 |
| | | Flexural modulus (MPa) | | 2 | 39 | 80 | 150 | 1 | 200 |
| | | Foam filling | | ○ | ○ | ○ | ○ | Δ *4 | ○ |
| | | Workability of mounting to pillar | | ○ | ○ | ○ | ○ | ○ | Δ *5 |

*1 EVA (ethylene-vinyl acetate copolymer), PE (Low-density polyethylene)
EVAFLEX EV40LX (Available from DU PONT-MITSUI POLYCHEMICALS Co., Ltd., MFR2.0, Contains 41 mass % polyvinyl acetate)
EVAFLEX EV460 (Available from DU PONT-MITSUI POLYCHEMICALS Co., Ltd., MFR2.5, Contains 19 mass % polyvinyl acetate)
ULTRASEN 543 (Available from Tosoh Corporation, MFR1.3, Contains 10 mass % polyvinyl acetate)
ULTRASEN 511F (Available from Tosoh Corporation, MFR2.5, Contains 6 mass % polyvinyl acetate)
ULTRASEN 760 (Available from Tosoh Corporation, MFR70, Contains 42 mass % polyvinyl acetate)
SUMIKASEN G210 (Available from Sumitomo Mitsui Polyolefin)
*2 OBSH: 4,4'-oxybis(benzenesulfonyl hydrazide), Available from EIWA KASEI KOGYO, Neosrene HM806P, Contains 80 weight % OBSH, 20 weight % EPDM)
*3 DCP: Dicumylperoxide, Available from NOF Corporation, PARCUMYL D-40MBK, Contains 40 weight % dicumylperoxide, 60 weight % silica + EPDM)
*4 Foam layer was slacked, so that foam filling failure was partly incurred.
*5 Flexural modulus was so high that workability of mounting to pillar was down.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A foam filling member for forming foam to fill up a space of a structure, which comprises a foam sheet formed from foamable material to foam by heating to be a foam and formed in sheet form, and a fixing member for fixing the foam sheet in the space of the structure, wherein the foam sheet is formed in a looped shape so that an overlapped portion, where portions of the foam sheet are overlapped with each other in a thickness direction thereof, is formed, wherein the fixing member comprises a retaining portion for holding the overlapped portion in sandwich relation in a thickness direction of the foam sheet to retain the foam sheet, and a fixing portion for fixing the foam sheet in the structure, the fixing member being a member independent from the foam sheet, and formed from a rigid resin, and wherein the retaining portion comprises a base portion, a side wall which projects from the base portion, and a top wall which extends from an upper portion of the side wall so as to confront the base portion at a spaced interval, and a free end of the base portion and a free end of the top wall define a receiving opening for receiving the overlapped portion of the foam sheet, such that the overlapped portion of the foam sheet is received in the receiving opening to be held by the retaining portion in a sandwich relation between the base portion and the top wall.

2. The foam filling member according to claim 1, wherein the foam sheet has a flexural modulus of 2-180 MPa.

3. The foam filling member according to claim 1, wherein the base portion, the side wall, and the top wall of the retaining portion are formed in a substantially U-shaped cross-section.

4. The foam filling member according to claim 1, wherein the side wall and the top wall of the retaining portion are each shaped like a generally rectangular plate.

5. The foam filling member according to claim 1, wherein the retaining portion further comprises a pawl portion disposed on the free end of the top wall and having a triangular cross-section projecting toward the base portion, such that the overlapped portion of the foam sheet is held in the retaining portion between the pawl portion and the base portion.

* * * * *